(12) United States Patent
Eguchi et al.

(10) Patent No.: US 12,460,698 B2
(45) Date of Patent: Nov. 4, 2025

(54) TOOTHED BELT AND TOOTHED BELT TRANSMISSION DEVICE

(71) Applicant: Mitsuboshi Belting Ltd., Kobe (JP)

(72) Inventors: Naoki Eguchi, Hyogo (JP); Yuya Teduka, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/282,939

(22) PCT Filed: Mar. 29, 2022

(86) PCT No.: PCT/JP2022/015508
§ 371 (c)(1),
(2) Date: Sep. 19, 2023

(87) PCT Pub. No.: WO2022/210728
PCT Pub. Date: Oct. 6, 2022

(65) Prior Publication Data
US 2024/0159295 A1    May 16, 2024

(30) Foreign Application Priority Data

Mar. 30, 2021 (JP) .................................. 2021-056839
Dec. 21, 2021 (JP) .................................. 2021-206966
Mar. 22, 2022 (JP) .................................. 2022-045220

(51) Int. Cl.
*F16G 1/16* (2006.01)
*F16G 1/28* (2006.01)
(Continued)

(52) U.S. Cl.
CPC ............. *F16G 1/28* (2013.01); *F16H 55/06* (2013.01); *F16H 55/088* (2013.01); *F16H 55/171* (2013.01); *F16H 55/38* (2013.01)

(58) Field of Classification Search
CPC ................. F16G 1/16; F16G 1/28; F16G 1/10
See application file for complete search history.

(56) References Cited

U.S. PATENT DOCUMENTS 6,964,626 B1 * 11/2005  Wu ........................ C08G 18/42
                                                                         528/80
8,684,693 B2    4/2014  Mascioni et al.
(Continued)

FOREIGN PATENT DOCUMENTS

CN         202370752 U    8/2012
CN         105579740 A    5/2016
(Continued)

OTHER PUBLICATIONS

Jun. 21, 2022—International Search Report—Intl App PCT/JP2022/015508.
(Continued)

*Primary Examiner* — Gregory Robert Weber
(74) *Attorney, Agent, or Firm* — Banner & Witcoff, Ltd.

(57) ABSTRACT

The present invention relates to a toothed belt including: a back portion; a tension member embedded in the back portion in a belt longitudinal direction and including a twisted cord including a steel fiber; a plurality of belt teeth formed on an inner peripheral side of the back portion along the belt longitudinal direction; and a cover layer provided between the tension member and a belt tooth bottom formed between the belt teeth, in which the cover layer has a thickness in a range of 0.2 mm to 1.0 mm, and the back portion, the belt teeth, and the cover layer are integrally formed of a thermoplastic elastomer.

6 Claims, 7 Drawing Sheets

(51) Int. Cl.
  *F16H 55/06*  (2006.01)
  *F16H 55/08*  (2006.01)
  *F16H 55/17*  (2006.01)
  *F16H 55/38*  (2006.01)

(56) References Cited

U.S. PATENT DOCUMENTS

| | | | |
|---|---|---|---|
| 10,816,062 B2 * | 10/2020 | Konno | F16G 1/28 |
| 2016/0208889 A1 | 7/2016 | Yoshida et al. | |
| 2017/0191545 A1 * | 7/2017 | Sekiguchi | C08G 18/10 |
| 2018/0245672 A1 | 8/2018 | Konno et al. | |
| 2020/0182329 A1 * | 6/2020 | Ikeda | F16G 1/28 |
| 2022/0221027 A1 | 7/2022 | Quass et al. | |

FOREIGN PATENT DOCUMENTS

| | | |
|---|---|---|
| CN | 110621907 A | 12/2019 |
| EP | 2306046 B1 | 1/2015 |
| JP | 2018-141496 A | 9/2018 |
| JP | 2018-204790 A | 12/2018 |
| JP | 2019-029211 A | 2/2019 |
| JP | 2020-038008 A | 3/2020 |
| WO | 2013-156497 A1 | 10/2013 |
| WO | 2020-233863 A1 | 11/2020 |

OTHER PUBLICATIONS

Mar. 28, 2025—(EP) Extended Search Report—App 22780939.9.
Aug. 22, 2025—(CN) Notification of First Office Action—App 202280022570.3.

* cited by examiner

TOOTHED BELT AND TOOTHED BELT TRANSMISSION DEVICE

CROSS REFERENCE TO RELATED APPLICATIONS

This is a U.S. National Phase Application under 35 U.S.C. § 371 of International Application No. PCT/JP2022/015508, filed Mar. 29, 2022, which claims priority to Japanese Application Nos. 2021-056839, filed Mar. 30, 2021; 2021-206966, filed Dec. 21, 2021; and 2022-045220, filed Mar. 22, 2022, which were published Under PCT Article 21(2), the entire contents of which are incorporated herein by reference.

TECHNICAL FIELD

The present invention relates to a toothed belt which is required to have power-transmission performance under a high tension condition corresponding to an environment with a relatively high load (high torque).

BACKGROUND ART

Regarding a wind power generator, a pitch of blades of a windmill (an angle of a toothed pulley for axially rotating the blades) is changed, and a rotational speed of the windmill is adjusted in order to improve the efficiency in weak wind and to reduce the efficiency in strong wind (see FIG. 1). For example, Patent Literatures 1, 2, and 3 disclose modes in which the pitch of the blade is controlled by a driving (synchronous power-transmission) method using a toothed belt.

In these modes, since the toothed belt for driving is installed in a vicinity of a root of the blade, a phenomenon in which the vicinity of the root of the blade swings little by little in the strong wind often occurs. In this case, the meshing between the belt teeth and the pulley in the driving by the toothed belt makes a small forward and backward movement (reciprocating movement) due to the influence thereof. In such a forward and backward movement, when the tooth bottom portion of the toothed belt is strongly pressed against the pulley, the tooth bottom portion of the toothed belt is intensively rubbed little by little, so that the belt tooth bottom is remarkably worn. In addition, when the wear of the belt tooth bottom progresses until a tension member embedded in the belt teeth is worn or cut, the belt strength decreases, and finally, the belt may be cut.

In general, in a synchronous power-transmission mechanism using a toothed belt, a rotational speed and a reciprocating movement of a drive pulley are performed under predetermined (constant) conditions as in an elevating conveyance device. However, in the application of a wind power generator, the rotation and reciprocating movement of a drive pulley are performed under the condition depending on the movement of the wind. Therefore, a specific design different from a general application is required, and in particular, a toothed belt for the application is required to have wear resistance on the tooth bottom portion against a small forward and backward movement (a reciprocating movement caused by forward and reverse rotation) and a high strength that can withstand strong wind.

In this application, as a method for preventing wear of a belt tooth bottom of a toothed belt, Patent Literature 4 discloses a toothed belt power-transmission device in which a tip of a belt tooth is in contact with a pulley tooth bottom, a tip of a pulley tooth is not in contact with a belt tooth bottom, and a gap S is provided between the tip of the pulley tooth and the belt tooth bottom.

CITATION LIST

Patent Literature

Patent Literature 1: CN202370752U
Patent Literature 2: U.S. Pat. No. 8,684,693
Patent Literature 3: WO2013/156497
Patent Literature 4: JP2018-204790A

SUMMARY OF INVENTION

Technical Problem

In the mode in which the gap S is provided between the tip of the pulley tooth and the belt tooth bottom (see FIG. 1 of Patent Literature 4), a method for transmitting power (tooth tip power-transmission method) in which only the tip portion (tooth tip portion) of the belt tooth portion is in contact with the pulley and the belt tooth bottom is not in contact with the pulley in the meshing between the toothed belt and the pulley is used. Therefore, even in an application in which a small forward and backward movement (a reciprocating movement caused by forward and reverse rotation) is performed, wear of the belt tooth bottom can be prevented.

However, in the original synchronous power-transmission, it is desirable that the tooth tip portion and the belt tooth bottom both come into contact with and mesh with the pulley in terms of efficiency of power-transmission and durability of the belt tooth portion. That is, the method in which the belt tooth bottom does not come into contact with the pulley is effective in wear resistance, but is disadvantageous in power-transmission and durability of the belt tooth portion.

On the other hand, in recent years, in the field of wind power generators, the size of the wind power generator has been increased (the capacity of the power generation has been increased), and accordingly, a toothed belt is required to transmit power under a high tension condition corresponding to a higher load (high torque) environment. Therefore, in the method in which the tooth bottom portion is not in contact with the pulley (tooth tip power-transmission method) disclosed in Patent Literature 4, it is not possible to follow power-transmission under a high tension condition, and a mode advantageous in power-transmission performance and durability of the tooth portion is required.

Further, in the field of wind power generators, the installation location is changing from land in the related art to the ocean. When installed on the ocean, rust preventability against salt water is required.

However, in the mode disclosed in Patent Literature 4, the tension member (steel cord) is disposed at a position exposed to the tooth bottom surface in the belt tooth bottom, and thus rust may be generated in the steel cord due to the salt water. A mode in which the belt tooth bottom is covered with a reinforcing fabric (nylon 66 woven fabric) is also disclosed, but rust may be generated in the steel cord due to moisture absorbed by the reinforcing fabric. Accordingly, it is required to improve the rust preventability of the tension member (steel cord).

An object of the present invention is to provide a toothed belt and a toothed belt power-transmission device which can be adapted to power-transmission in a high load environment (high tension condition) associated with an increase in size (increase in power generation capacity) of a wind power generator in recent years and can also be adapted to rust preventability associated with installation on ocean (offshore wind power generation).

Solution to Problem

The present invention is a toothed belt including:
a back portion;
a tension member embedded in the back portion in a belt longitudinal direction and including a twisted cord including a steel fiber;
a plurality of belt teeth formed on an inner peripheral side of the back portion along the belt longitudinal direction; and
a cover layer provided between the tension member and a belt tooth bottom formed between the belt teeth,
in which the cover layer has a thickness in a range of 0.2 mm to 1.0 mm, and
the back portion, the belt teeth, and the cover layer are integrally formed of a thermoplastic elastomer.

According to the above configuration, the cover layer having a thickness of 0.2 mm to 1.0 mm is provided between the belt tooth bottom and the tension member (on the inner peripheral side of the tension member), so that the tension member including the twisted cord including the steel fiber is not positioned on a surface of the belt tooth bottom (the tension member is not directly exposed and the position of the tension member can be separated from the belt tooth bottom). Therefore, wear or cutting of the tension member is prevented even if the belt tooth bottom and the tip portion of the pulley tooth come into contact with each other during meshing with the pulley. In particular, when the cover layer is provided, protection can be provided against wear or cutting of the tension member due to a small forward and backward movement (a reciprocating movement caused by forward and reverse rotation).

In addition, since the tension member is entirely embedded in the thermoplastic elastomer, there is no part where the tension member comes into contact with the surface of the belt tooth bottom or is exposed, and contact between the tension member (twisted cord including the steel fiber) and moisture is prevented, so that rust preventability against moisture can be ensured.

In the toothed belt according to the present invention, a pitch between the belt teeth may be 14 mm or more, and a height of each of the belt teeth may be 5 mm or more.

According to the above configuration, in the case where the pitch between the belt teeth (tooth pitch) is defined by the standard or the like as an index representing the scale of the toothed belt, by increasing the tooth pitch (that is, the belt teeth), it is possible to ensure the meshing property between the toothed belt and the toothed pulley and a shearing force of the belt teeth for satisfying load bearing in the application in which the power-transmission performance under the high tension condition corresponding to the environment with a relatively high load (high torque) is required. Therefore, durability, wear resistance, power-transmission performance, and rust preventability can be ensured in the toothed belt belonging to a relatively large size category.

In the toothed belt according to the present invention, the toothed belt may be wound around a plurality of toothed pulleys, each having a plurality of pulley teeth formed on an outer periphery thereof so as to mesh with the belt teeth, such that a tip portion of each of the belt teeth comes into contact with a pulley tooth bottom formed between the pulley teeth, and a tip portion of each of the pulley teeth comes into contact with the belt tooth bottom.

According to the above configuration, the tip portion of the belt tooth comes into contact with the pulley tooth bottom, and the tip portion of the pulley tooth comes into contact with the belt tooth bottom, so that a load (tooth load) applied to the belt tooth is also dispersed to the belt tooth bottom portion. Therefore, it is possible to perform synchronous power-transmission in an advantageous manner in terms of power-transmission and durability of the belt teeth. Accordingly, in the toothed belt that is required to have power-transmission performance under a high tension condition corresponding to an environment with a relatively high load (high torque), particularly as in a large (large capacity) wind power generator, the toothed belt can follow power-transmission under the high tension condition, and wear resistance of the tension member can be ensured.

In the toothed belt according to the present invention, the toothed belt may be used in an environment in which a tension applied to the toothed belt fluctuates due to an external factor, and the tension is 0.30 kN/mm or more in a normal state and is 0.80 kN/mm to 1.10 kN/mm at most.

For example, as in a toothed belt power-transmission device that is mounted on a wind power generator and adjusts a blade pitch, even when a vicinity of a root of a blade of the wind power generator swings little by little in strong wind, and the meshing between the belt teeth and the pulley in the driving by the toothed belt makes a small forward and backward movement (a reciprocating movement) due to the influence thereof, or a phenomenon in which a large tension is suddenly applied to the toothed belt occurs (at that time, the tension (load) applied to the toothed belt is assumed), the toothed belt that can withstand it can be provided.

Another aspect of the present invention is a toothed belt power-transmission device including:
the toothed belt; and
a plurality of toothed pulleys each having a plurality of pulley teeth formed on an outer periphery thereof so as to mesh with the belt teeth of the toothed belt,
in which the toothed belt is wound around the plurality of toothed pulleys such that a tip portion of each of the belt teeth comes into contact with a pulley tooth bottom formed between the pulley teeth and a tip portion of each of the pulley teeth comes into contact with the belt tooth bottom, thereby performing synchronous power-transmission.

In the toothed belt power-transmission device according to the present invention, the toothed belt may be used in an environment in which a tension applied to the toothed belt fluctuates due to an external factor, and the tension is 0.30 kN/mm or more in a normal state and is 0.80 kN/mm to 1.10 kN/mm at most.

Advantageous Effects of Invention

According to the present invention, it is possible to provide a toothed belt and a toothed belt power-transmission device which can be adapted to power-transmission in a high load environment (high tension condition) associated with an increase in size (increase in power generation capacity) of a wind power generator in recent years and can also be adapted to rust preventability associated with installation on ocean (offshore wind power generation).

Figure 4:
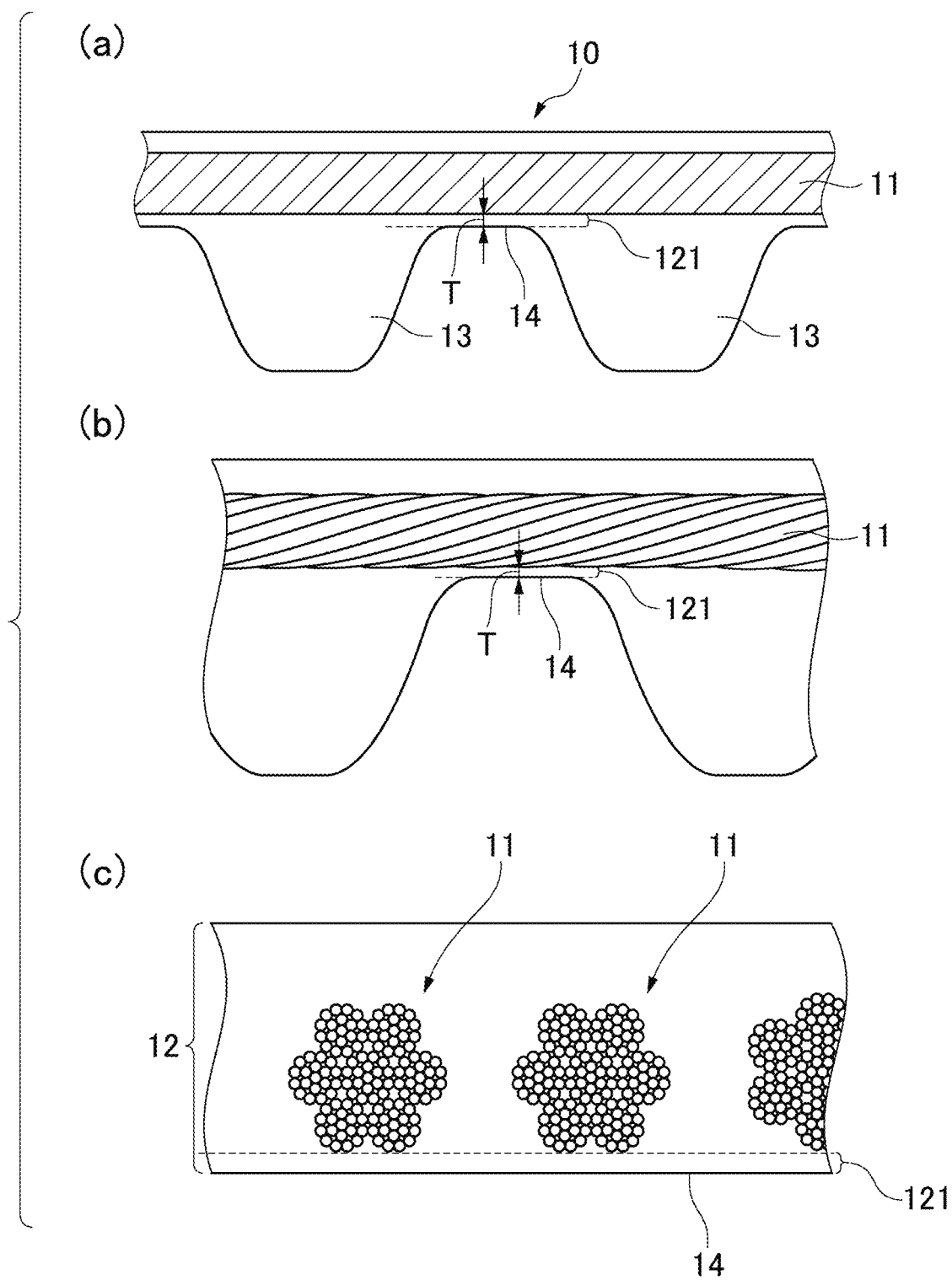

(a) of FIG. 4 is a cross-sectional view of the toothed belt, which is taken along the belt longitudinal direction. (b) of FIG. 4 is a photograph of a cross section of the toothed belt, which is taken along the belt longitudinal direction. (c) of FIG. 4 is a photograph of a cross section of the toothed belt, which is taken along the belt width direction.

Figure 5:
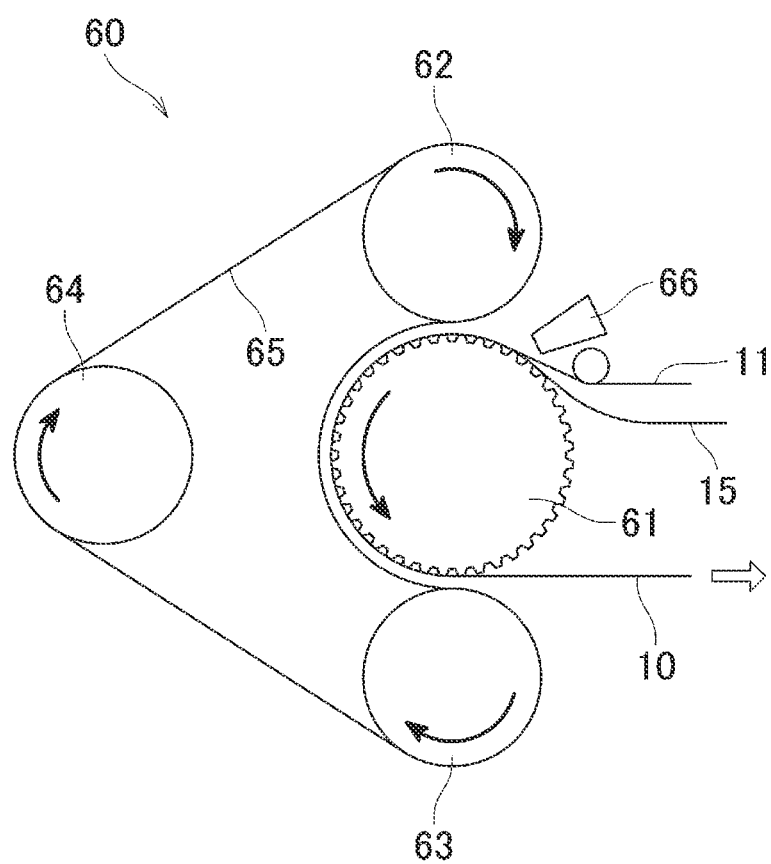

FIG. 5 is a schematic view illustrating a method for producing the toothed belt according to the embodiment of the present invention.

Figure 6:
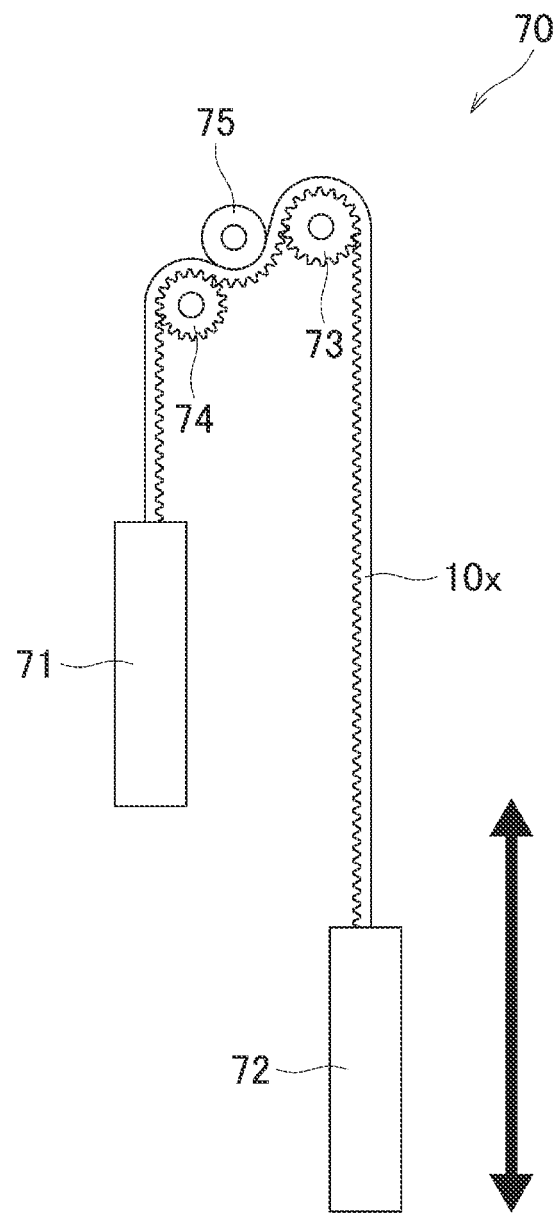

FIG. 6 is a schematic diagram showing a running tester used in a running test.

Figure 7:
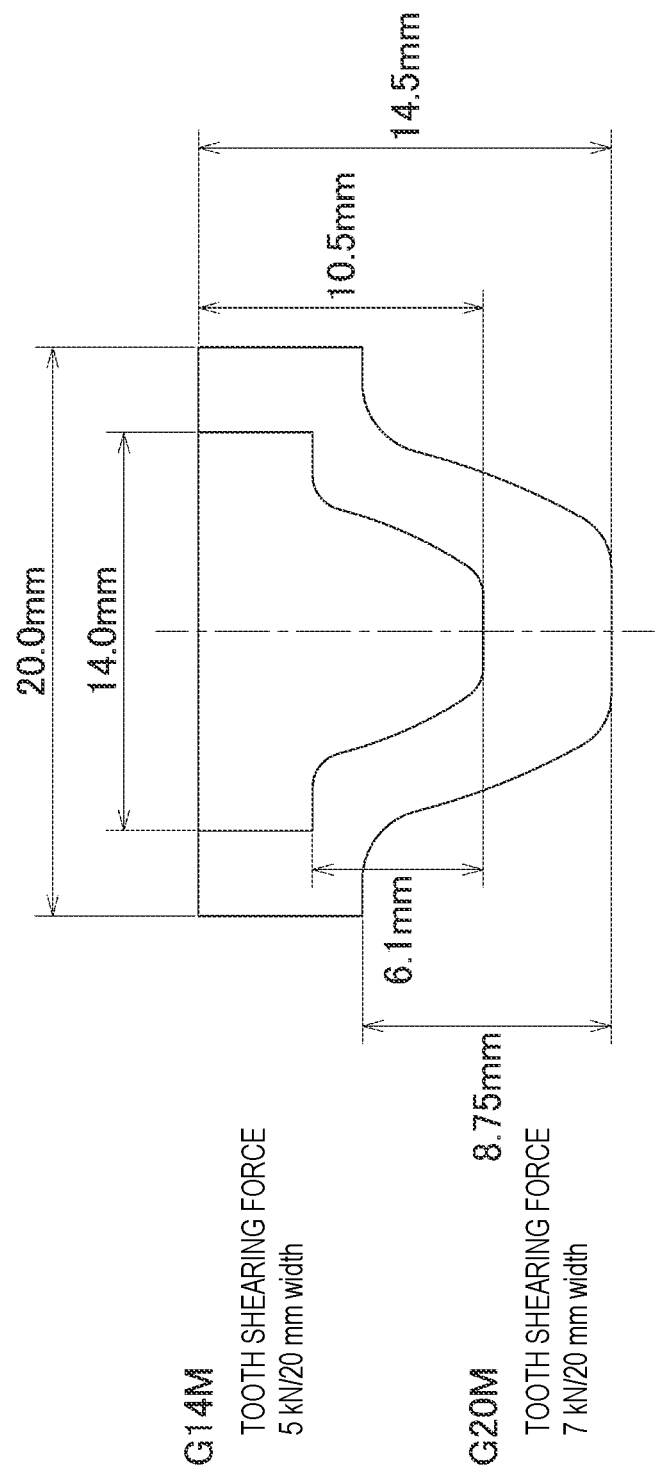

FIG. 7 is an illustration view of tooth shapes (G14M, G20M) of the toothed belt.

DESCRIPTION OF EMBODIMENTS (Toothed Belt Power-Transmission Device 1)

The toothed belt power-transmission device 1 according to the present invention is preferably used for power-transmission under a high tension condition corresponding to a high load (high torque) environment. As an index of the high load environment, the toothed belt power-transmission device 1 is used in a use environment in which tension applied to a toothed belt 10 usually fluctuates and is 0.30 kN/mm or more in a normal state, and the maximum tension of 0.80 kN/mm to 1.10 kN/mm is applied. As another index, the toothed belt power-transmission device 1 is used in a use environment in which a torque applied to the toothed belt 10 usually fluctuates and reaches 15 kN m to 45 kN m at maximum.

Examples of an application of the toothed belt power-transmission device 1 include a belt-type drive device in which an angle of a blade in a wind power generator is adjusted in a high load environment corresponding to a wind direction or a wind force which is always changed and is generated in the natural world (from normal wind to strong wind).

Figure 1:
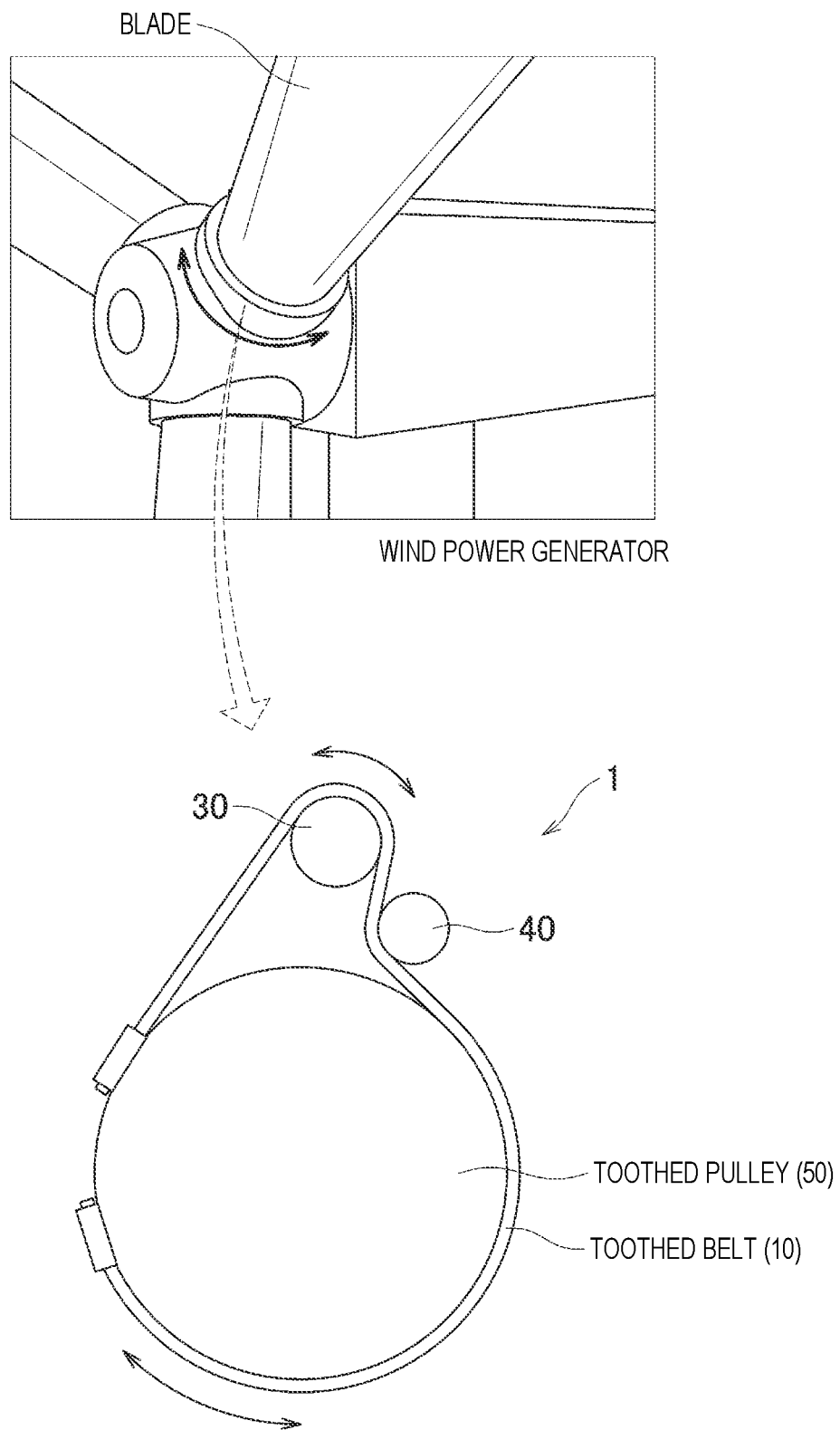
FIG. 1 is an illustration view of a toothed belt power-transmission device according to an embodiment of the present invention.

Specifically, as shown in FIG. 1, the toothed belt power-transmission device 1 used as a belt-type drive device mainly includes a drive pulley 30, a toothed pulley 50 (driven pulley), an idler pulley 40, and the toothed belt 10 wound around the drive pulley 30, the toothed pulley 50, and the idler pulley 40. Then, rotational power of the drive pulley 30 is transmitted to the toothed pulley 50, and a blade interlocking with the rotation of the toothed pulley 50 is axial-rotated, so that a pitch (angle) of the blade of the wind power generator is changed.

The toothed belt power-transmission device 1 is not limited to being used as the belt-type drive device in the wind power generator, and can be used in any drive device requiring similar characteristics.

(Toothed Belt 10)

Next, the toothed belt 10 according to an embodiment of the present invention will be described with reference to the drawings.

Figure 2:
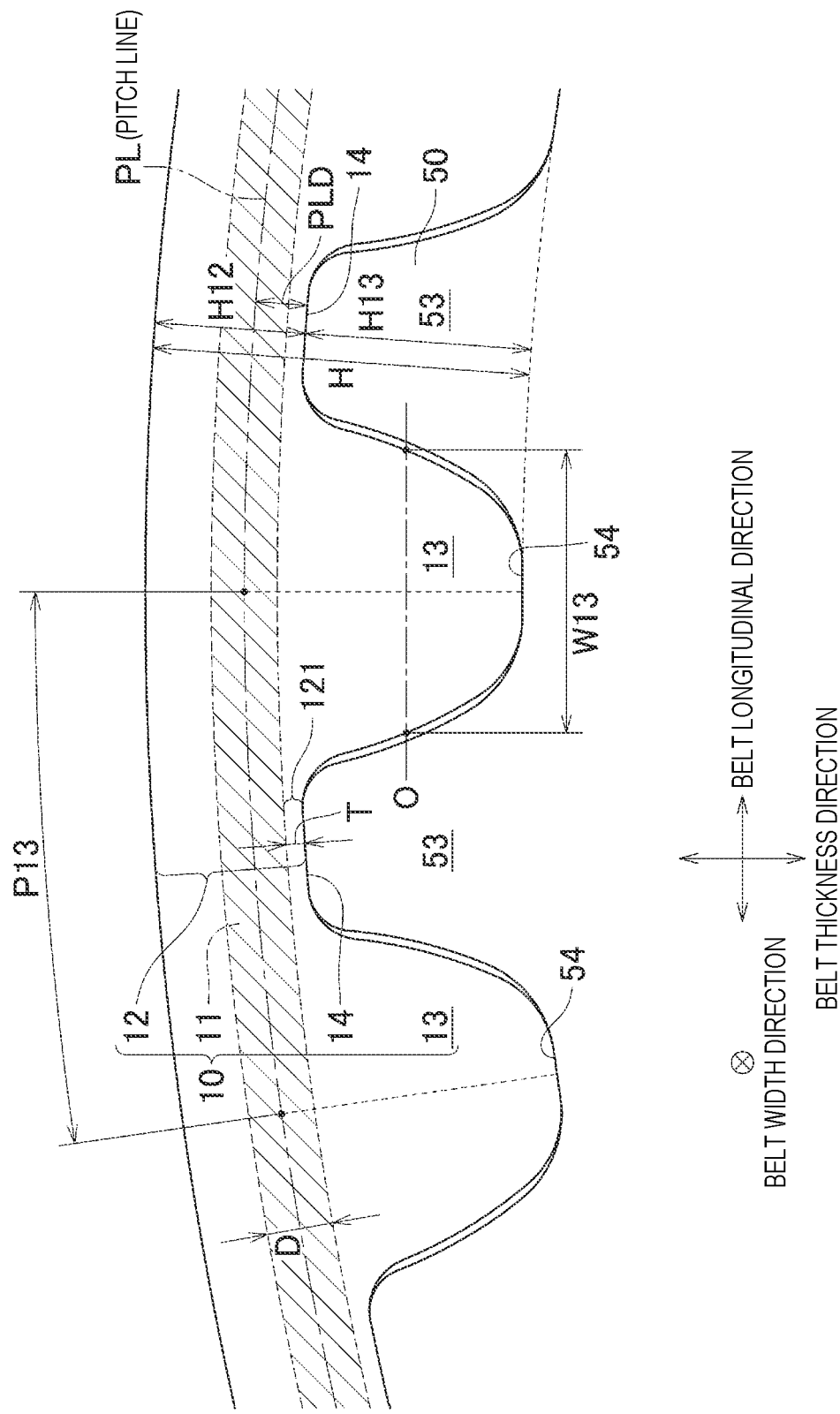
FIG. 2 is a side view showing a part of the toothed belt power-transmission device according to the embodiment of the present invention, which is taken along a belt longitudinal direction (viewed from an arrow direction I in FIG. 3).
Figure 3:
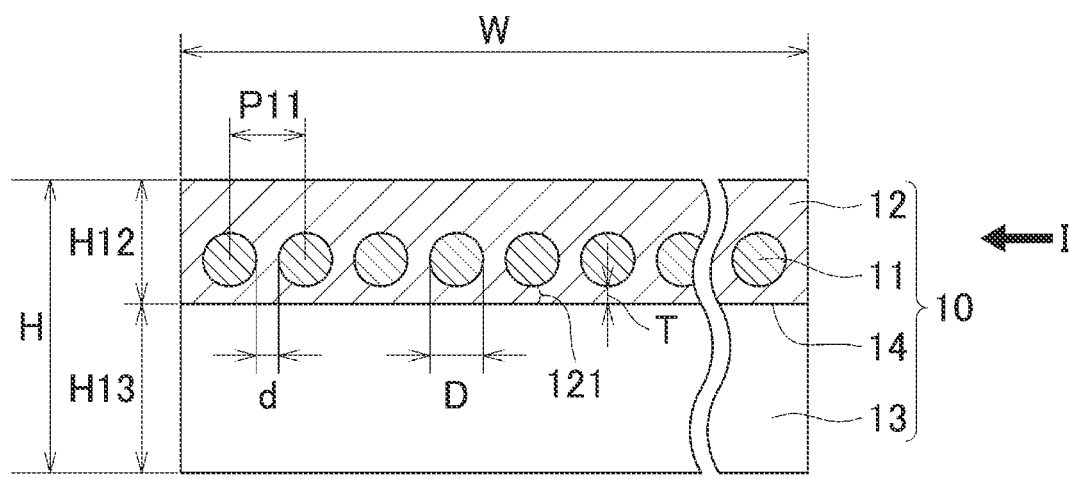
FIG. 3 is a cross-sectional view of a toothed belt according to the embodiment of the present invention, which is taken along a belt width direction.
Figure 3:
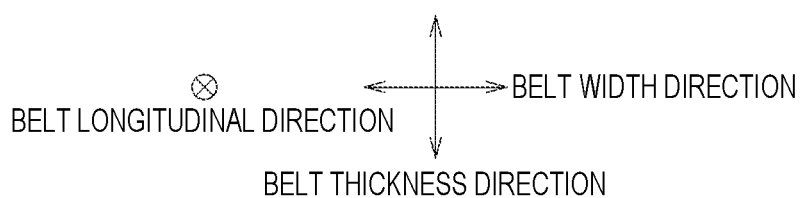

The toothed belt 10 according to the present embodiment is an open-ended synchronous power-transmission belt, and as shown in FIG. 2 to FIG. 4, the toothed belt 10 includes a plurality of tension members 11, a back portion 12 in which the plurality of tension members 11 are embedded in a belt longitudinal direction, a plurality of belt teeth 13 formed on an inner peripheral side of the back portion 12 along the belt longitudinal direction, and a plurality of belt tooth bottoms 14 each formed between a belt tooth 13 and another belt tooth 13.

The plurality of belt teeth 13 face the back portion 12 in a belt thickness direction (a height direction of the belt teeth 13) and are disposed apart from one another in the belt longitudinal direction.

The belt teeth 13 and the belt tooth bottoms 14 are alternately formed in the belt longitudinal direction. The belt tooth bottom 14 is a bottom portion of a recessed portion formed between two belt teeth 13 adjacent to each other in the belt longitudinal direction.

In the belt tooth bottom 14, a cover layer 121 is provided between the belt tooth bottom 14 and the tension member 11 (on an inner peripheral side of the tension member 11) so that the plurality of tension members 11 are not exposed from a surface of the belt tooth bottom 14. The back portion 12, the plurality of belt teeth 13, and the cover layer 121 are integrally formed of a thermoplastic elastomer. A thickness T (height in the belt thickness direction) of the cover layer 121 is 0.2 mm to 1.0 mm, and particularly preferably about 0.3 mm to 0.6 mm.

The toothed belt 10 is not limited to the mode or the structure shown in FIG. 2 to FIG. 4. For example, a cross-sectional shape of the belt tooth 13 (the cross-sectional shape of the toothed belt 10 in the belt longitudinal direction) is not limited to a trapezoidal shape and may be a semicircular shape, a semi-elliptical shape, and a polygonal shape (triangular shape, quadrangular shape (rectangular shape, etc.), etc.) as long as the plurality of belt teeth 13 can mesh with pulley teeth 53 of the toothed pulley 50.

An interval between the belt teeth 13 adjacent to each other (tooth pitch P13) in the belt longitudinal direction is preferably, for example, 14 mm to 25 mm. The numerical value of the tooth pitch P13 also corresponds to a size of a scale of the belt tooth 13 (a length of the belt tooth 13 in the belt longitudinal direction and a tooth height of the belt tooth 13). That is, as the tooth pitch P13 increases, the scale of the belt tooth 13 also increases in a similar manner. In particular, in applications where a high load acts, the belt tooth 13 having a large scale is required, and the tooth pitch P13 may be 14 mm or more, and more preferably 20 mm or more. Normally, an interval (distance) between adjacent belt teeth 13 on a pitch line (PL) shown in FIG. 2 is defined as the tooth pitch P13. A distance from the belt tooth bottom 14 to the PL is referred to as pitch line differential (PLD). The width of the belt tooth 13 in the belt longitudinal direction at a center position O in the belt thickness direction (height direction of the belt tooth 13) is defined as a width (W13) of the belt tooth 13 (see FIG. 2).

In the present embodiment, the toothed belt 10 satisfies the following requirements.

Belt width W=20 mm to 300 mm
Total belt thickness H=9 mm to 16 mm
Thickness H12 of back portion 12=4 mm or more
Thickness T of cover layer 121=0.2 mm to 1.0 mm
Height H13 of each belt tooth 13=5 mm to 12 mm
Pitch P13 (a distance on pitch line PL) of belt teeth 13=14 mm to 25 mm
Belt strength per 1 mm of belt width=1 kN or more (preferably 2.0 kN or more and 5.0 kN or less)

In the case where the pitch P13 of the belt teeth 13 is defined by the standard or the like as an index representing the scale of the toothed belt 10, by increasing the tooth pitch P13 (that is, the belt teeth 13), it is possible to ensure the meshing property between the toothed belt 10 and the toothed pulley 50 and a shearing force of the belt teeth 13 for satisfying load bearing in the application in which the power-transmission performance under the high tension condition corresponding to the environment with a relatively high load (high torque) is required. Therefore, durability, wear resistance, power-transmission performance, and rust preventability can be ensured in the toothed belt 10 belonging to a relatively large size category.

(Tension Member 11)

Each tension member 11 includes a steel cord (a cord obtained by twisting steel fibers (strands)). The steel cord is not limited to a cord formed only of steel fibers, and may be, for example, a twisted cord obtained by combining other fibers such as aramid fibers or carbon fibers. The plurality of tension members 11 extend in the belt longitudinal direction and are arranged in the belt width direction. In FIG. 2, the pitch line PL is defined as center positions of the tension members 11 in the belt thickness direction. The pitch line PL is a reference line in the belt longitudinal direction of the toothed belt 10 that maintains the same length without stretching and contracting in the belt longitudinal direction even when the toothed belt 10 is bent along an outer periphery of the toothed pulley 50.

(Density of Tension Member Array)

The tension members 11 are embedded in the back portion 12 in parallel at a predetermined interval d in the belt width direction along the belt longitudinal direction. That is, as shown in FIG. 3, the tension members 11 are arranged in the back portion 12 at the predetermined interval d in the belt width direction. More specifically, the tension members 11 are preferably embedded in the back portion 12 such that a ratio (%) of a total value of the intervals d each between a tension member 11 and another tension member 11 adjacent to each other in the belt width direction to the belt width W is in a range of 13% or more and 50% or less. The total value of the intervals d each between a tension member 11 and another tension member 11 adjacent to each other in the belt width direction includes an interval between an end of the toothed belt 10 and a tension member 11 (both end parts). That is, the total value of the intervals d each between a tension member 11 and another tension member 11 in the belt width direction is a value obtained by subtracting a value of the "total of the tension member diameters D (tension member diameter D×the number of tension members)" from the value of the "belt width W". Therefore, the ratio (%) of the total value of the intervals d each between a tension member 11 and another tension member 11 adjacent to each other in the belt width direction (the intervals d between the tension members 11) to the belt width W is a value calculated by the following "Formula 1".

Ratio (%) of "total of intervals $d$" to belt width $W =$ (Formula 1)

$(\text{"total of intervals } d\text{"/belt width } W) \times 100 =$ $((\text{belt width } W - \text{"total of cord diameter } D\text{"})/\text{belt width } W) \times$ $100 = ((\text{belt width } W -$ $(\text{cord diameter } D \times \text{number of cords}))/\text{belt width } W) \times 100 =$ $(1 - (\text{cord diameter } D \times \text{number of cords})/\text{belt width } W) \times$ $100$ As the ratio (%) of a total value of the intervals d each between a tension member 11 and another tension member 11 adjacent to each other in the belt width direction to the belt width W decreases, the interval d between a tension member 11 and another tension member 11 decreases. Therefore, it can be said that the degree of density of the tension member array is increased (becomes dense). As the degree of density of the tension member array increases (becomes dense), the number of tension members arranged per unit width of the belt increases. Therefore, the strength of the belt increases.

In the present embodiment, the tension members 11 and the density of the tension member array satisfy the following requirements.

The diameter D of each tension member 11=1.5 mm or more (preferably, 2.3 mm to 7.0 mm)

The strength of each tension member 11=2.0 kN or more (preferably, 7.0 kN to 40 kN)

The pitch P11 of the tension members 11=1.8 mm or more (preferably, 2.8 mm to 8.5 mm)

The interval d between the tension members 11=0.2 mm to 3.0 mm (preferably, 0.3 mm to 1.7 mm)

The ratio of the total value of intervals d between the tension members 11 to the belt width W=13% to 50% (preferably, 13% to 31%)

The distance PLD from the belt tooth bottom 14 to PL=1.35 mm to 4.50 mm

Here, in addition to the belt strength, the meshing property between the toothed belt 10 and the toothed pulley 50 and the shearing force of the belt teeth 13 are also important as conditions that can satisfy the load bearing of the toothed belt. That is, when the belt teeth 13 are small, jumping (tooth jumping) of the belt teeth 13 may occur, and when the shearing force of the belt teeth 13 is small, a problem may occur in traveling (forward and backward movement), such as occurrence of tooth chipping at an early stage. Such a phenomenon is greatly affected by the selection of the scale of the belt teeth 13, so that a balance relationship between the belt strength and the scale of the belt teeth 13 is important. Therefore, by setting an appropriate relationship (numerical value) between the scale of the belt teeth 13 and the tension member 11 to the above-described relationship in consideration of the balance relationship, it is possible to satisfy the load bearing in the application in which the power-transmission performance under the high tension condition corresponding to the environment with a relatively high load is required.

(Back Portion 12, Belt Teeth 13, and Cover Layer 121)

The back portion 12, the plurality of belt teeth 13, and the cover layer 121 are integrally formed of a thermoplastic elastomer. The thermoplastic elastomer constituting the back portion 12, the plurality of belt teeth 13, and the cover layer 121 may be, for example, a polyurethane-based thermoplastic elastomer, a polyester-based thermoplastic elastomer, a polystyrene-based thermoplastic elastomer, a polyolefin-based thermoplastic elastomer, a polyamide-based thermoplastic elastomer, and a vinyl chloride-based thermoplastic elastomer, or a combination of two or more thereof. In particular, a polyurethane-based thermoplastic elastomer is preferably used. The polyurethanes constituting the polyurethane-based thermoplastic elastomer may be polyether polyurethanes, polyester polyurethanes, or polycarbonate polyurethanes. The hardness of the thermoplastic elastomer may be 300 to 700 (measured by a D-type hardness meter in accordance with JIS K6253: 2012), preferably 40° to 70°, and more preferably 500 to 60°.

(Toothed Pulley 50)

As shown in FIG. 1 and FIG. 2, the toothed pulley 50 includes a plurality of pulley teeth 53 provided on an outer periphery so as to mesh with the belt teeth 13 of the toothed belt 10, and a plurality of pulley tooth bottoms 54 each formed between two adjacent pulley teeth 53.

The pulley teeth 53 and the pulley tooth bottoms 54 are alternately formed along the belt longitudinal direction of the toothed belt 10 to be wound. The pulley tooth bottom 54 is a bottom portion of a recessed portion formed between two pulley teeth 53 adjacent to each other in the belt longitudinal direction.

The belt tooth 13 is fitted into a recessed portion formed between two adjacent pulley teeth 53 in the toothed pulley 50. The pulley tooth 53 is fitted into a recessed portion formed between two belt teeth 13 adjacent to each other in the belt longitudinal direction. When the toothed pulley 50 and the toothed belt 10 mesh with each other, a tip portion of the belt tooth 13 comes into contact with the pulley tooth bottom 54, and a tip portion of the pulley tooth 53 comes into contact with the belt tooth bottom 14.

In this way, the tip portion of the belt tooth 13 comes into contact with the pulley tooth bottom 54, and the tip portion of the pulley tooth 53 comes into contact with the belt tooth bottom 14, so that a load (tooth load) applied to the belt tooth 13 is also dispersed to the belt tooth bottom portion 14. Therefore, it is possible to perform synchronous power-transmission in an advantageous manner in terms of power-transmission and durability of the belt teeth 13. Accordingly, in the toothed belt 10 that is required to have power-transmission performance under a high tension condition corresponding to an environment with a relatively high load (high torque), particularly as in a large (large capacity) wind power generator, the toothed belt can follow power-transmission under the high tension condition, and wear resistance of the tension member 11 can be ensured.

According to the toothed belt 10 and the toothed belt power-transmission device 1 having the above configuration, the cover layer 121 having a thickness of 0.2 mm to 1.0 mm is provided between the belt tooth bottom 14 and the tension member 11 (on the inner peripheral side of the tension member 11), so that the tension member 11 including a twisted cord including steel fibers is not positioned on the surface of the belt tooth bottom 14 (the tension member 11 is not directly exposed and the position of the tension member 11 can be separated from the belt tooth bottom 14). Therefore, wear or cutting of the tension members 11 is prevented even if the belt tooth bottom 14 and the tip portion of the pulley tooth 53 come into contact with each other during meshing with the toothed pulley 50. In particular, when the cover layer 121 is provided, protection can be provided against wear or cutting of the tension member 11 due to a small forward and backward movement (a reciprocating movement caused by forward and reverse rotation).

In addition, since the tension members 11 are entirely embedded in the thermoplastic elastomer, there is no part where the tension member 11 comes into contact with the surface of the belt tooth bottom 14 or is exposed, and contact between the tension member 11 (twisted cord including steel fibers) and moisture is prevented, so that rust preventability against moisture can be ensured.

In addition, in the case where the toothed belt power-transmission device 1 is used in a belt-type drive device that adjusts an angle of a blade in a wind power generator in a high load environment (environment in which the tension applied to the toothed belt 10 fluctuates due to an external factor) corresponding to a wind direction or a wind force which is always changed and is generated in the natural world (from normal wind to strong wind), the toothed belt power-transmission device 1 is used in a use environment in which the tension applied to the toothed belt 10 constantly fluctuates, and the tension of 0.30 kN/mm or more in a normal state and 0.80 kN/mm to 1.10 kN/mm at most is applied. As another index, the toothed belt power-transmission device 1 is used in a use environment in which a torque applied to the toothed belt 10 constantly fluctuates and reaches 15 kN·m to 45 kN·m at maximum. In such an environment, even when a vicinity of a root of a blade of the wind power generator swings little by little in the strong wind, the meshing between the belt teeth 13 and the toothed pulley 50 in the driving by the toothed belt 10 makes a small forward and backward movement (reciprocating movement) due to the influence thereof, or a phenomenon in which a large tension is suddenly applied to the toothed belt 10 occurs, the toothed belt 10 and the toothed belt power-transmission device 1 that can withstand it can be provided.

(Method For Producing Toothed Belt)

Next, an example of a method for producing the toothed belt 10 will be described.

The toothed belt 10 is produced by, for example, a production device 60 as shown in FIG. 5. The production device 60 includes a forming drum 61, pulleys 62 and 63 respectively disposed close to upper and lower sides of the forming drum 61, a pulley 64 facing the forming drum 61 in a horizontal direction, a pressing band 65 which is an endless metal band wound around the pulleys 62 to 64, an extrusion head 66 for extruding a thermoplastic elastomer, a tension member feeder (not shown), and a cover layer sheet feeder (not shown).

Grooves for forming the belt teeth 13 are formed on an outer peripheral surface of the forming drum 61 at predetermined intervals in the circumferential direction. The pulley 64 is movable in a horizontal direction relative to the forming drum 61, and applies a predetermined tension to the pressing band 65. The pressing band 65 is disposed so as to be wound around the outer peripheral surface of the forming drum 61 by about a half circumference, and is pressed against the outer peripheral surface of the forming drum 61 by application of the tension from the pulley 64.

The cover layer sheet feeder (not shown) feeds a cover layer sheet 15 obtained by previously forming a thermoplastic elastomer into a sheet shape to the outer peripheral surface of the forming drum 61. The tension member feeder (not shown) feeds the plurality of tension members 11 aligned in an axial direction of the forming drum 61 to an outer peripheral surface side of the cover layer sheet 15 fed to the outer peripheral surface of the forming drum 61. The extrusion head 66 supplies the thermoplastic elastomer in a state of being melted by heating to outer peripheral surface sides of the cover layer sheet 15 and the tension member 11 which are supplied to the outer peripheral surface of the forming drum 61.

The thermoplastic elastomer in a molten state supplied to the outer peripheral surface of the forming drum 61, the plurality of tension members 11, and the cover layer sheet 15 are caught between the forming drum 61 and the pressing band 65 as the forming drum 61 rotates. At this time, the grooves formed in the outer peripheral surface of the forming drum 61 are filled with the thermoplastic elastomer by a pressing force of the pressing band 65, and the belt teeth 13 are formed in the grooves. At this time, the fed cover layer sheet 15 is disposed between the outer peripheral surface of the forming drum 61 and the plurality of tension members 11 in a part which becomes the belt tooth bottom 14, and is disposed in other portions in a mixed manner with the fed thermoplastic elastomer in a molten state. The back portion 12 in which the plurality of tension members 11 are embedded is formed between the cover layer sheet 15 disposed on the outer peripheral surface of the forming drum 61 and the pressing band 65. Then, the thermoplastic elastomer is cooled and solidified while the thermoplastic elastomer is strongly pressed against the outer peripheral surface of the forming drum 61 by the pressing force of the pressing band 65. The toothed belt 10 is continuously taken out at a part where the pressing band 65 is separated from the forming drum 61. In a series of forming processes in which the above thermoplastic material is cooled and solidified from the molten state, the cover layer sheet 15 (thermoplastic elastomer) is integrated with the thermoplastic elastomer forming the belt teeth 13 and the back portion 12 supplied in the molten state.

Examples

Toothed belts according to Examples 1 to 41, Comparative Examples 1 to 14, and Reference Examples 1 to 6 were produced using the thermoplastic elastomer by the above-described production method, and the rust preventability of the toothed belt and the running performance of the toothed belt power-transmission device were verified. The configurations and verification results of the toothed belt power-transmission devices according to Examples 1 to 41, Comparative Examples 1 to 14, and Reference Examples 1 to 6 are shown in Table 1 to Table 11.

TABLE 1

| | | | Comp. Ex. 1 | Comp. Ex. 2 | Comp. Ex. 3 | Comp. Ex. 4 |
|---|---|---|---|---|---|---|
| Tension member 1 | Number of tension members | | colspan 6 |||
| | Diameter (D) of each tension member | | 2.5 mm (strand = 84) ||||
| | Strength of each tension member | | 7.2 kN ||||
| | Pitch (P11) of tension members | | 3.2 mm ||||
| | Interval (d) between tension members | | 0.7 mm ||||
| | Ratio of total value of intervals (d) to belt width (W) | | 25% ||||
| Thermoplastic elastomer | Kind | | polyester polyurethane ||||
| | Hardness (Type D) | | 50 ||||
| Reinforcing fabric (inner peripheral surface) | | | Yes (66 nylon woven fabric, thickness: 0.5 mm) ||||
| Thickness of cover layer (inner peripheral side of tension member) | | | 0 mm ||||
| Type Dimension | Belt width (W) | | 20 mm ||||
| | Tooth type | | G14M ||||
| | Height (H13) of belt tooth | | 6.1 mm ||||
| | Pitch (P13) of belt teeth | | 14 mm ||||
| | Belt width (W13) at center position (O) | | 7.5 mm ||||
| Relationship with pulley | Gap (S) | | 0.25 mm | 0.5 mm | 0.8 mm | 0 mm |
| | Ratio of gap (S) to height (H13) of belt tooth | | 4.1% | 8.2% | 13.1% | 0% |
| Belt strength | | | 2.19 kN/mm | 2.18 kN/mm | 2.17 kN/mm | 2.18 kN/mm |
| Rust preventability | After 720 hours after salt spray test | Rust of tension members | There is rust ||||
| | | Belt strength | 2.06 kN/mm ||||
| | | Decrease rate of strength | 6% ||||
| | | Rust preventability | C ||||
| Running performance | Set tension 7.0 kN | Number of running cycles | 1200000 | 1200000 | 1200000 | 1200000 |
| | | Failure of belt | No | No | No | No |
| | | State of belt tooth portion | A | A | B | B |
| | | State of belt tooth bottom | B | A | A | C |
| | | Belt strength (after running) | 2.16 kN/mm | 2.15 kN/mm | 2.15 kN/mm | 1.11 kN/mm |
| | | Decrease rate of strength | 1% | 1% | 1% | 49% |
| | | Determination | B | A | B | C |
| | Set tension 8.0 kN | Number of running cycles | 1200000 | 1200000 | 1000000 | 850000 |
| | | Failure of belt | No | No | Tooth chipping | Tension member breakage |
| | | State of belt tooth portion | B | B | C | B |
| | | State of belt tooth bottom | B | B | B | C |
| | | Belt strength (after running) | 2.01 kN/mm | 1.94 kN/mm | 1.65 kN/mm | — |
| | | Decrease rate of strength | 8% | 11% | 24% | — |
| | | Determination | B | B | C | D |
| | Set tension 11.2 kN | Number of running cycles | 600000 | 500000 | 400000 | 650000 |
| | | Failure of belt | Tooth chipping | Tooth chipping | Tooth chipping | Tension member breakage |
| | | State of belt tooth portion | C | C | C | C |
| | | State of belt tooth bottom | B | B | B | C |
| | | Belt strength (after running) | — | — | — | — |
| | | Decrease rate of strength | — | — | — | — |
| | | Determination | D | D | D | D |

TABLE 1-continued

|  |  |  | Comp. Ex. 5 | Comp. Ex. 6 | Comp. Ex. 7 |
|---|---|---|---|---|---|
| Tension member 1 | | Number of tension members | | 6 | |
| | | Diameter (D) of each tension member | | 2.5 mm (strand = 84) | |
| | | Strength of each tension member | | 7.2 kN | |
| | | Pitch (P11) of tension members | | 3.2 mm | |
| | | Interval (d) between tension members | | 0.7 mm | |
| | | Ratio of total value of intervals (d) to belt width (W) | | 25% | |
| Thermoplastic elastomer | | Kind | | polyester polyurethane | |
| | | Hardness (Type D) | | 50 | |
| Reinforcing fabric (inner peripheral surface) | | | | No | |
| Thickness of cover layer (inner peripheral side of tension member) | | | | 0 mm | |
| Type Dimension | | Belt width (W) | | 20 mm | |
| | | Tooth type | | G14M | |
| | | Height (H13) of belt tooth | | 6.1 mm | |
| | | Pitch (P13) of belt teeth | | 14 mm | |
| | | Belt width (W13) at center position (O) | | 7.5 mm | |
| Relationship with pulley | | Gap (S) | 0.25 mm | 0.5 mm | 0.8 mm |
| | | Ratio of gap (S) to height (H13) of belt tooth | 4.1% | 8.2% | 13.1% |
| Belt strength | | | 2.17 kN/mm | 2.19 kN/mm | 2.18 kN/mm |
| Rust preventability | After 720 hours after salt spray test | Rust of tension members | | There is rust | |
| | | Belt strength | | 2.01 kN/mm | |
| | | Decrease rate of strength | | 8% | |
| | | Rust preventability | | C | |
| Running performance | Set tension 7.0 kN | Number of running cycles | 1200000 | 1200000 | 1200000 |
| | | Failure of belt | No | No | No |
| | | State of belt tooth portion | B | A | B |
| | | State of belt tooth bottom | B | A | A |
| | | Belt strength (after running) | 2.15 kN/mm | 2.16 kN/mm | 2.15 kN/mm |
| | | Decrease rate of strength | 1% | 1% | 1% |
| | | Determination | B | A | B |
| | Set tension 8.0 kN | Number of running cycles | 1200000 | 1200000 | 1000000 |
| | | Failure of belt | No | No | Tooth chipping |
| | | State of belt tooth portion | B | B | C |
| | | State of belt tooth bottom | B | B | B |
| | | Belt strength (after running) | 1.97 kN/mm | 1.86 kN/mm | 1.70 kN/mm |
| | | Decrease rate of strength | 9% | 15% | 22% |
| | | Determination | B | B | C |
| | Set tension 11.2 kN | Number of running cycles | 600000 | 500000 | 400000 |
| | | Failure of belt | Tooth chipping | Tooth chipping | Tooth chipping |
| | | State of belt tooth portion | C | C | C |
| | | State of belt tooth bottom | B | B | B |
| | | Belt strength (after running) | — | — | — |
| | | Decrease rate of strength | — | — | — |
| | | Determination | D | D | D |

|  |  |  | Comp. Ex. 8 | Ex. 1 | Ex. 2 | Ex. 3 |
|---|---|---|---|---|---|---|
| Tension member 1 | | Number of tension members | | 6 | | |
| | | Diameter (D) of each tension member | | 2.5 mm (strand = 84) | | |
| | | Strength of each tension member | | 7.2 kN | | |
| | | Pitch (P11) of tension members | | 3.2 mm | | |
| | | Interval (d) between tension members | | 0.7 mm | | |
| | | Ratio of total value of intervals (d) to belt width (W) | | 25% | | |
| Thermoplastic elastomer | | Kind | | polyester polyurethane | | |
| | | Hardness (Type D) | | 50 | | |
| Reinforcing fabric (inner peripheral surface) | | | | No | | |
| Thickness of cover layer (inner peripheral side of tension member) | | | 0 mm | 0.2 mm | 0.5 mm | 0.8 mm |
| Type Dimension | | Belt width (W) | | 20 mm | | |
| | | Tooth type | | G14M | | |
| | | Height (H13) of belt tooth | | 6.1 mm | | |
| | | Pitch (P13) of belt teeth | | 14 mm | | |
| | | Belt width (W13) at center position (O) | | 7.5 mm | | |
| Relationship with pulley | | Gap (S) | | 0 mm | | |
| | | Ratio of gap (S) to height (H13) of belt tooth | | 0% | | |
| Belt strength | | | 2.18 kN/mm | 2.18 kN/mm | 2.18 kN/mm | 2.17 kN/mm |

TABLE 1-continued

| Rust preventability | After 720 hours after salt spray test | Rust of tension members | There is rust | | There is no rust | |
|---|---|---|---|---|---|---|
| | | Belt strength | 2.01 kN/mm | 2.14 kN/mm | 2.14 kN/mm | 2.13 kN/mm |
| | | Decrease rate of strength | 8% | 2% | 2% | 2% |
| | | Rust preventability | C | A | A | A |
| Running performance | Set tension 7.0 kN | Number of running cycles | 1200000 | 1200000 | 1200000 | 1200000 |
| | | Failure of belt | No | No | No | No |
| | | State of belt tooth portion | B | B | A | B |
| | | State of belt tooth bottom | C | B | A | A |
| | | Belt strength (after running) | 0.99 kN/mm | 1.79 kN/mm | 2.15 kN/mm | 2.14 kN/mm |
| | | Decrease rate of strength | 55% | 20% | 1% | 1% |
| | | Determination | C | B | A | B |
| | Set tension 8.0 kN | Number of running cycles | 830000 | 1200000 | 1200000 | 1200000 |
| | | Failure of belt | Tension member breakage | No | No | No |
| | | State of belt tooth portion | B | B | B | B |
| | | State of belt tooth bottom | C | B | A | A |
| | | Belt strength (after running) | — | 1.92 kN/mm | 1.98 kN/mm | 1.96 kN/mm |
| | | Decrease rate of strength | — | 12% | 9% | 10% |
| | | Determination | D | B | B | B |
| | Set tension 11.2 kN | Number of running cycles | 830000 | 1000000 | 1200000 | 1000000 |
| | | Failure of belt | Tension member breakage | Tension member breakage | No | Tooth chipping |
| | | State of belt tooth portion | C | B | B | C |
| | | State of belt tooth bottom | C | C | B | A |
| | | Belt strength (after running) | — | — | 0.63 kN/mm | 0.61 kN/mm |
| | | Decrease rate of strength | — | — | 71% | 72% |
| | | Determination | D | C | B | C |

TABLE 2

| | | | Ex. 4 | Ex. 2 | Ex. 5 | Ref. Ex. 1 |
|---|---|---|---|---|---|---|
| Tension member 1 | Number of tension members | | 5 | 6 | 7 | 8 |
| | Diameter (D) of each tension member | | 2.5 mm (strands = 84) | | | |
| | Strength of each tension member | | 7.2 kN | | | |
| | Pitch (P11) of tension members | | 4.0 mm | 3.2 mm | 2.8 mm | 2.5 mm |
| | Interval (d) between tension members | | 1.5 mm | 0.7 mm | 0.3 mm | 0.0 mm |
| | Ratio of total value of intervals (d) to belt width (W) | | 38% | 25% | 13% | 0% |
| Thermoplastic elastomer | Kind | | Polyester polyurethane | | | |
| | Hardness (Type D) | | 50 | | | |
| Reinforcing fabric (inner peripheral surface) | | | No | | | |
| Thickness of cover layer (inner peripheral side of tension member) | | | 0.5 mm | | | |
| Type Dimension | Belt width (W) | | 20 mm | | | |
| | Tooth type | | G14M | | | |
| | Height (H13) of belt tooth | | 6.1 mm | | | |
| | Pitch (P13) of belt teeth | | 14 mm | | | |
| | Belt width (W13) at center position (O) | | 7.5 mm | | | |
| Relationship with pulley | Gap (S) | | 0 mm | | | |
| | Ratio of gap (S) to height (H13) of belt tooth | | 0% | | | |
| Belt strength | | | 1.18 kN/mm | 2.18 kN/mm | 2.53 kN/mm | 2.88 kN/mm |
| Rust preventability | After 720 hours after salt spray test | Rust of tension members | There is no rust | | | |
| | | Belt strength | 1.15 kN/mm | 2.14 kN/mm | 2.48 kN/mm | 2.82 kN/mm |
| | | Decrease rate of strength | 3% | 2% | 2% | 2% |
| | | Rust preventability | A | A | A | A |
| Running performance | Set tension 7.0 kN | Number of running cycles | 1200000 | 1200000 | 1200000 | 200000 |
| | | Failure of belt | No | No | No | belt cut in round slice |
| | | State of belt tooth portion | B | A | A | B |
| | | State of belt tooth bottom | B | A | A | A |
| | | Belt strength (after running) | 0.58 kN/mm | 2.15 kN/mm | 2.51 kN/mm | — |
| | | Decrease rate of strength | 50% | 1% | 1% | — |
| | | Determination | B | A | A | D |
| | Set tension 8.0 kN | Number of running cycles | 1200000 | 1200000 | 1200000 | 100000 |
| | | Failure of belt | No | No | No | belt cut in round slice |

TABLE 2-continued

|  |  |  |  |  |  |  |
|---|---|---|---|---|---|---|
|  |  | State of belt tooth portion | B | B | B | B |
|  |  | State of belt tooth bottom | B | A | A | A |
|  |  | Belt strength (after running) | 0.34 kN/mm | 1.98 kN/mm | 2.03 kN/mm | — |
|  |  | Decrease rate of strength | 71% | 9% | 9% | — |
|  |  | Determination | B | B | B | D |
| Set tension 11.2 kN |  | Number of running cycles | 1000000 | 1200000 | 1200000 | 50000 |
|  |  | Failure of belt | Tension member breakage | No | No | belt cut in round slice |
|  |  | State of belt tooth portion | B | B | B | B |
|  |  | State of belt tooth bottom | B | B | B | B |
|  |  | Belt strength (after running) | — | 0.63 kN/mm | 0.73 kN/mm | — |
|  |  | Decrease rate of strength | — | 71% | 71% | — |
|  |  | Determination | C | B | B | D |

|  |  |  | Ex. 6 | Ex. 7 | Ref. Ex. 2 |
|---|---|---|---|---|---|
| Tension member 1 | Number of tension members |  | 6 | | |
|  | Diameter (D) of each tension member |  | 2.5 mm (strands = 84) | | |
|  | Strength of each tension member |  | 7.2 kN | | |
|  | Pitch (P11) of tension members |  | 3.2 mm | | |
|  | Interval (d) between tension members |  | 0.7 mm | | |
|  | Ratio of total value of intervals (d) to belt width (W) |  | 25% | | |
| Thermoplastic elastomer | Kind |  | Polyester polyurethane | | |
|  | Hardness (Type D) |  | 50 | | |
| Reinforcing fabric (inner peripheral surface) |  |  | No | | |
| Thickness of cover layer (inner peripheral side of tension member) |  |  | 0.5 mm | | |
| Type Dimension | Belt width (W) |  | 20 mm | | |
|  | Tooth type |  | G20M | G25M | S8M |
|  | Height (H13) of belt tooth |  | 8.75 mm | 10.8 mm | 2.95 mm |
|  | Pitch (P13) of belt teeth |  | 20 mm | 25 mm | 8 mm |
|  | Belt width (W13) at center position (O) |  | 10.6 mm | 13.4 mm | 4.8 mm |
| Relationship with pulley | Gap (S) |  | 0 mm | | |
|  | Ratio of gap (S) to height (H13) of belt tooth |  | 0% | | |
| Belt strength |  |  | 2.19 kN/mm | 2.17 kN/mm | 2.18 kN/mm |
| Rust preventability | After 720 hours after salt spray test | Rust of tension members | | | |
|  |  | Belt strength | 2.17 kN/mm | 2.15 kN/mm | 2.16 kN/mm |
|  |  | Decrease rate of strength | 1% | 1% | 1% |
|  |  | Rust preventability | A | A | A |
| Running performance | Set tension 7.0 kN | Number of running cycles | 1200000 | 1200000 | 500000 |
|  |  | Failure of belt | No | No | Tooth chipping |
|  |  | State of belt tooth portion | A | A | C |
|  |  | State of belt tooth bottom | A | A | C |
|  |  | Belt strength (after running) | 2.17 kN/mm | 2.15 kN/mm | 2.14 kN/mm |
|  |  | Decrease rate of strength | 1% | 1% | 2% |
|  |  | Determination | A | A | D |
|  | Set tension 8.0 kN | Number of running cycles | 1200000 | 1200000 | 300000 |
|  |  | Failure of belt | No | No | Tooth chipping |
|  |  | State of belt tooth portion | B | B | C |
|  |  | State of belt tooth bottom | A | A | C |
|  |  | Belt strength (after running) | 2.02 kN/mm | 2.02 kN/mm | 2.12 kN/mm |
|  |  | Decrease rate of strength | 8% | 7% | 3% |
|  |  | Determination | B | B | D |
|  | Set tension 11.2 kN | Number of running cycles | 1200000 | 1200000 | 100000 |
|  |  | Failure of belt | No | No | Tooth chipping |
|  |  | State of belt tooth portion | B | B | C |
|  |  | State of belt tooth bottom | B | B | C |
|  |  | Belt strength (after running) | 0.72 kN/mm | 0.67 kN/mm | 2.14 kN/mm |
|  |  | Decrease rate of strength | 67% | 69% | 2% |
|  |  | Determination | B | B | D |

TABLE 3

|  |  |  | Ex. 2 | Ex. 8 | Ex. 9 | Ex. 10 |
|---|---|---|---|---|---|---|
| Tension member 1 | Number of tension members | | colspan="4" | 6 | | |
| | Diameter (D) of each tension member | | colspan="4" | 2.5 mm (strands = 84) | | |
| | Strength of each tension member | | colspan="4" | 7.2 kN | | |
| | Pitch (P11) of tension members | | colspan="4" | 3.2 mm | | |
| | Interval (d) between tension members | | colspan="4" | 0.7 mm | | |
| | Ratio of total value of intervals (d) to belt width (W) | | colspan="4" | 25% | | |
| Thermoplastic elastomer | Kind | | Polyester polyurethane | Polyether polyurethane | Polyamide | Polyester polyurethane |
| | Hardness (Type D) | | | 50 | | 30 |
| Reinforcing fabric (inner peripheral surface) | | | colspan="4" | No | | |
| Thickness of cover layer (inner peripheral side of tension member) | | | colspan="4" | 0.5 mm | | |
| Type | Belt width (W) | | colspan="4" | 20 mm | | |
| Dimension | Tooth type | | colspan="4" | G14M | | |
| | Height (H13) of belt tooth | | colspan="4" | 6.1 mm | | |
| | Pitch (P13) of belt teeth | | colspan="4" | 14 mm | | |
| | Belt width (W13) at center position (O) | | colspan="4" | 7.5 mm | | |
| Relationship with pulley | Gap (S) | | colspan="4" | 0 mm | | |
| | Ratio of gap (S) to height (H13) of belt tooth | | colspan="4" | 0% | | |
| Belt strength | | | 2.18 kN/mm | 2.17 kN/mm | 2.17 kN/mm | 2.18 kN/mm |
| Rust preventability | After 720 hours after salt spray test | Rust of tension members | colspan="4" | There is no rust | | |
| | | Belt strength | 2.14 kN/mm | 2.13 kN/mm | 2.13 kN/mm | 2.15 kN/mm |
| | | Decrease rate of strength | 2% | 2% | 2% | 2% |
| | | Rust preventability | A | A | A | A |
| Running performance | Set tension 7.0 kN | Number of running cycles | 1200000 | 1200000 | 1200000 | 1200000 |
| | | Failure of belt | No | No | No | No |
| | | State of belt tooth portion | A | A | A | B |
| | | State of belt tooth bottom | A | A | A | B |
| | | Belt strength (after running) | 2.15 kN/mm | 2.10 kN/mm | 2.13 kN/mm | 2.15 kN/mm |
| | | Decrease rate of strength | 1% | 1% | 2% | 1% |
| | | Determination | A | A | A | B |
| | Set tension 8.0 kN | Number of running cycles | 1200000 | 1200000 | 1200000 | 1200000 |
| | | Failure of belt | No | No | No | No |
| | | State of belt tooth portion | B | B | B | B |
| | | State of belt tooth bottom | A | A | A | B |
| | | Belt strength (after running) | 1.98 kN/mm | 1.97 kN/mm | 2.02 kN/mm | 1.99 kN/mm |
| | | Decrease rate of strength | 9% | 9% | 7% | 9% |
| | | Determination | B | B | B | B |
| | Set tension 11.2 kN | Number of running cycles | 1200000 | 1200000 | 1200000 | 1000000 |
| | | Failure of belt | No | No | No | Tooth chipping |
| | | State of belt tooth portion | B | B | B | C |
| | | State of belt tooth bottom | B | B | B | C |
| | | Belt strength (after running) | 0.63 kN/mm | 0.65 kN/mm | 0.61 kN/mm | 2.07 kN/mm |
| | | Decrease rate of strength | 71% | 70% | 72% | 5% |
| | | Determination | B | B | B | C |

|  |  |  | Ex. 11 | Ex. 12 | Ex. 13 |
|---|---|---|---|---|---|
| Tension member 1 | Number of tension members | | colspan="3" | 6 | | |
| | Diameter (D) of each tension member | | colspan="3" | 2.5 mm (strands = 84) | | |
| | Strength of each tension member | | colspan="3" | 7.2 kN | | |
| | Pitch (P11) of tension members | | colspan="3" | 3.2 mm | | |
| | Interval (d) between tension members | | colspan="3" | 0.7 mm | | |
| | Ratio of total value of intervals (d) to belt width (W) | | colspan="3" | 25% | | |
| Thermoplastic elastomer | Kind | | colspan="3" | Polyester polyurethane | | |
| | Hardness (Type D) | | 40 | 60 | 70 |

TABLE 3-continued

| | | | | | |
|---|---|---|---|---|---|
| | Reinforcing fabric (inner peripheral surface) | | | No | |
| | Thickness of cover layer (inner peripheral side of tension member) | | | 0.5 mm | |
| Type Dimension | Belt width (W) | | | 20 mm | |
| | Tooth type | | | G14M | |
| | Height (H13) of belt tooth | | | 6.1 mm | |
| | Pitch (P13) of belt teeth | | | 14 mm | |
| | Belt width (W13) at center position (O) | | | 7.5 mm | |
| Relationship with pulley | Gap (S) | | | 0 mm | |
| | Ratio of gap (S) to height (H13) of belt tooth | | | 0% | |
| Belt strength | | | 2.17 kN/mm | 2.18 kN/mm | 2.19 kN/mm |
| Rust preventability | After 720 hours after salt spray test | Rust of tension members | There is no rust | | |
| | | Belt strength | 2.13 kN/mm | 2.14 kN/mm | 2.15 kN/mm |
| | | Decrease rate of strength | 2% | 2% | 2% |
| | | Rust preventability | A | A | A |
| Running performance | Set tension 7.0 kN | Number of running cycles | 1200000 | 1200000 | 1200000 |
| | | Failure of belt | No | No | No |
| | | State of belt tooth portion | A | A | B |
| | | State of belt tooth bottom | B | A | B |
| | | Belt strength (after running) | 2.14 kN/mm | 2.14 kN/mm | 2.15 kN/mm |
| | | Decrease rate of strength | 1% | 2% | 2% |
| | | Determination | B | A | B |
| | Set tension 8.0 kN | Number of running cycles | 1200000 | 1200000 | 1200000 |
| | | Failure of belt | No | No | No |
| | | State of belt tooth portion | B | B | B |
| | | State of belt tooth bottom | A | A | B |
| | | Belt strength (after running) | 2.00 kN/mm | 2.02 kN/mm | 2.05 kN/mm |
| | | Decrease rate of strength | 8% | 7% | 6% |
| | | Determination | B | B | B |
| | Set tension 11.2 kN | Number of running cycles | 1200000 | 1200000 | 1200000 |
| | | Failure of belt | No | No | No |
| | | State of belt tooth portion | B | B | B |
| | | State of belt tooth bottom | B | B | B |
| | | Belt strength (after running) | 0.78 kN/mm | 0.90 kN/mm | 1.42 kN/mm |
| | | Decrease rate of strength | 64% | 59% | 35% |
| | | Determination | B | B | B |

TABLE 4

| | | Comp. Ex. 9 | Comp. Ex. 10 | Comp. Ex. 11 | Ex. 14 |
|---|---|---|---|---|---|
| Tension member 2 | Number of tension members | | 6 | | |
| | Diameter (D) of each tension member | | 3.3 mm (strands = 84) | | |
| | Strength of each tension member | | 11 kN | | |
| | Pitch (P11) of tension members | | 3.9 mm | | |
| | Interval (d) between tension members | | 0.6 mm | | |
| | Ratio of total value of intervals (d) to belt width (W) | | 21% | | |
| Thermoplastic elastomer | Kind | | Polyester polyurethane | | |
| | Hardness (Type D) | | 50 | | |
| Reinforcing fabric (inner peripheral surface) | | | No | | |
| Thickness of cover layer (inner peripheral side of tension member) | | 0 mm | | | 0.2 mm |
| Type Dimension | Belt width (W) | | 25 mm | | |
| | Tooth type | | G14M | | |
| | Height (H13) of belt tooth | | 6.1 mm | | |
| | Pitch (P13) of belt teeth | | 14 mm | | |
| | Belt width (W13) at center position (O) | | 7.5 mm | | |
| Relationship with pulley | Gap (S) | 0.5 mm | 0.8 mm | 0 mm | |
| | Ratio of gap (S) to height (H13) of belt tooth | 8.2% | 13.1% | 0% | |
| Belt strength | | 2.64 kN/mm | 2.65 kN/mm | 2.65 kN/mm | 2.64 kN/mm |

TABLE 4-continued

| Rust preventability | After 720 hours after salt spray test | Rust of tension members | | There is rust | | There is no rust |
|---|---|---|---|---|---|---|
| | | Belt strength | | 2.46 kN/mm | | 2.61 kN/mm |
| | | Decrease rate of strength | | 7% | | 1% |
| | | Rust preventability | | C | | A |
| Running performance | Set tension 7.0 kN | Number of running cycles | 1200000 | 1200000 | 1200000 | 1200000 |
| | | Failure of belt | No | No | No | No |
| | | State of belt tooth portion | B | B | B | B |
| | | State of belt tooth bottom | A | A | C | B |
| | | Belt strength (after running) | 2.61 kN/mm | 2.62 kN/mm | 1.17 kN/mm | 2.50 kN/mm |
| | | Decrease rate of strength | 1% | 1% | 56% | 5% |
| | | Determination | B | B | C | B |
| | Set tension 8.0 kN | Number of running cycles | 1200000 | 1000000 | 960000 | 1200000 |
| | | Failure of belt | No | Tooth chipping | Tooth bottom wear | No |
| | | State of belt tooth portion | B | C | B | B |
| | | State of belt tooth bottom | A | A | C | B |
| | | Belt strength (after running) | 2.51 kN/mm | 2.17 kN/mm | 1.17 kN/mm | 2.14 kN/mm |
| | | Decrease rate of strength | 5% | 18% | 56% | 19% |
| | | Determination | B | C | D | B |
| | Set tension 11.2 kN | Number of running cycles | 760000 | 820000 | 950000 | 1200000 |
| | | Failure of belt | Tooth chipping | Tooth chipping | Tension member breakage | No |
| | | State of belt tooth portion | C | C | B | B |
| | | State of belt tooth bottom | A | A | C | B |
| | | Belt strength (after running) | — | — | — | 1.87 kN/mm |
| | | Decrease rate of strength | — | — | — | 23% |
| | | Determination | D | D | D | B |

| | | | Ex. 15 | Ex. 16 | Ex. 17 |
|---|---|---|---|---|---|
| Tension member 2 | Number of tension members | | | 6 | |
| | Diameter (D) of each tension member | | | 3.3 mm (strands = 84) | |
| | Strength of each tension member | | | 11 kN | |
| | Pitch (P11) of tension members | | | 3.9 mm | |
| | Interval (d) between tension members | | | 0.6 mm | |
| | Ratio of total value of intervals (d) to belt width (W) | | | 21% | |
| Thermoplastic elastomer | Kind | | | Polyester polyurethane | |
| | Hardness (Type D) | | | 50 | |
| Reinforcing fabric (inner peripheral surface) | | | | No | |
| Thickness of cover layer (inner peripheral side of tension member) | | | 0.3 mm | 0.5 mm | 0.8 mm |
| Type Dimension | Belt width (W) | | | 25 mm | |
| | Tooth type | | | G14M | |
| | Height (H13) of belt tooth | | | 6.1 mm | |
| | Pitch (P13) of belt teeth | | | 14 mm | |
| | Belt width (W13) at center position (O) | | | 7.5 mm | |
| Relationship with pulley | Gap (S) | | | 0 mm | |
| | Ratio of gap (S) to height (H13) of belt tooth | | | 0% | |
| Belt strength | | | 2.65 kN/mm | 2.65 kN/mm | 2.64 kN/mm |
| Rust preventability | After 720 hours after salt spray test | Rust of tension members | | There is no rust | |
| | | Belt strength | 2.61 kN/mm | 2.62 kN/mm | 2.61 kN/mm |
| | | Decrease rate of strength | 1% | 1% | 1% |
| | | Rust preventability | A | A | A |
| Running performance | Set tension 7.0 kN | Number of running cycles | 1200000 | 1200000 | 1200000 |
| | | Failure of belt | No | No | No |
| | | State of belt tooth portion | A | A | B |
| | | State of belt tooth bottom | A | A | B |
| | | Belt strength (after running) | 2.60 kN/mm | 2.63 kN/mm | 2.61 kN/mm |
| | | Decrease rate of strength | 1% | 1% | 1% |
| | | Determination | A | A | B |
| | Set tension 8.0 kN | Number of running cycles | 1200000 | 1200000 | 1200000 |
| | | Failure of belt | No | No | No |
| | | State of belt tooth portion | A | A | B |
| | | State of belt tooth bottom | A | A | A |

TABLE 4-continued

|  |  |  |  |  |  |
|---|---|---|---|---|---|
|  |  | Belt strength (after running) | 2.60 kN/mm | 2.62 kN/mm | 2.46 kN/mm |
|  |  | Decrease rate of strength | 2% | 1% | 7% |
|  |  | Determination | A | A | B |
|  | Set tension 11.2 kN | Number of running cycles | 1200000 | 1200000 | 1200000 |
|  |  | Failure of belt | No | No | No |
|  |  | State of belt tooth portion | B | B | B |
|  |  | State of belt tooth bottom | A | A | A |
|  |  | Belt strength (after running) | 2.51 kN/mm | 2.49 kN/mm | 2.35 kN/mm |
|  |  | Decrease rate of strength | 5% | 6% | 11% |
|  |  | Determination | B | B | B |

TABLE 5

|  |  |  | Ex. 18 | Ex. 16 | Ref. Ex. 3 |
|---|---|---|---|---|---|
| Tension member 2 | Number of tension members |  | 5 | 6 | 7 |
|  | Diameter (D) of each tension member |  | 3.3 mm (strands = 84) | | |
|  | Strength of each tension member |  | 11 kN | | |
|  | Pitch (P11) of tension members |  | 4.8 mm | 3.9 mm | 3.3 mm |
|  | Interval (d) between tension members |  | 1.5 mm | 0.6 mm | 0.0 mm |
|  | Ratio of total value of intervals (d) to belt width (W) |  | 34% | 21% | 7.6% |
| Thermoplastic elastomer | Kind |  | Polyester polyurethane | | |
|  | Hardness (Type D) |  | 50 | | |
| Reinforcing fabric (inner peripheral surface) |  |  | No | | |
| Thickness of cover layer (Inner peripheral side of tension member) |  |  | 0.5 mm | | |
| Type Dimension | Belt width (W) |  | 25 mm | | |
|  | Tooth type |  | 314M | | |
|  | Height (H13) of belt tooth |  | 6.1 mm | | |
|  | Pitch (P13) of belt teeth |  | 14 mm | | |
|  | Belt width (W13) at center position (O) |  | 7.5 mm | | |
| Relationship with pulley | Gap (S) |  | 0 mm | | |
|  | Ratio of gap (S) to height (H13) of belt tooth |  | 0% | | |
| Belt strength |  |  | 2.20 kN/mm | 2.65 kN/mm | 3.08 kN/mm |
| Rust preventability | After 720 hours after salt spray test | Rust of tension members | There is no rust | | |
|  |  | Belt strength | 2.18 kN/mm | 2.62 kN/mm | 3.05 kN/mm |
|  |  | Decrease rate of strength | 1% | 1% | 1% |
|  |  | Rust preventability | A | A | A |
| Running performance | Set tension 7.0 kN | Number of running cycles | 1200000 | 1200000 | 400000 |
|  |  | Failure of belt | No | No | belt cut in round slice |
|  |  | State of belt tooth portion | A | A | B |
|  |  | State of belt tooth bottom | A | A | B |
|  |  | Belt strength (after running) | 2.18 kN/mm | 2.63 kN/mm | — |
|  |  | Decrease rate of strength | 1% | 1% | — |
|  |  | Determination | A | A | D |
|  | Set tension 8.0 kN | Number of running cycles | 100000 | 1200000 | 350000 |
|  |  | Failure of belt | Tension member breakage | No | belt cut in round slice |
|  |  | State of belt tooth portion | B | A | B |
|  |  | State of belt tooth bottom | B | A | A |
|  |  | Belt strength (after running) | — | 2.62 kN/mm | — |
|  |  | Decrease rate of strength | — | 1% | — |
|  |  | Determination | C | A | D |
|  | Set tension 11.2 kN | Number of running cycles | 1000000 | 1200000 | 150000 |
|  |  | Failure of belt | Tension member breakage | No | belt cut in round slice |
|  |  | State of belt tooth portion | B | B | B |
|  |  | State of belt tooth bottom | B | A | A |
|  |  | Belt strength (after running) | — | 2.49 kN/mm | — |
|  |  | Decrease rate of strength | — | 6% | — |
|  |  | Determination | C | B | D |

TABLE 5-continued

|  |  |  | Ex. 19 | Ex. 20 | Ref. Ex. 4 |
|---|---|---|---|---|---|
| Tension member 2 | Number of tension members | | colspan=3 align=center | 6 | |
| | Diameter (D) of each tension member | | colspan=3 align=center | 3.3 mm (strands = 84) | |
| | Strength of each tension member | | colspan=3 align=center | 11 kN | |
| | Pitch (P11) of tension members | | colspan=3 align=center | 3.9 mm | |
| | Interval (d) between tension members | | colspan=3 align=center | 0.6 mm | |
| | Ratio of total value of intervals (d) to belt width (W) | | colspan=3 align=center | 21% | |
| Thermoplastic elastomer | Kind | | | | |
| | Hardness (Type D) | | | | |
| Reinforcing fabric (inner peripheral surface) | | | | | |
| Thickness of cover layer (Inner peripheral side of tension member) | | | | | |
| Type | Belt width (W) | | colspan=3 align=center | 25 mm | |
| Dimension | Tooth type | | G20M | G25M | S8M |
| | Height (H13) of belt tooth | | 8.75 mm | 10.8 mm | 2.95 mm |
| | Pitch (P13) of belt teeth | | 20 mm | 25 mm | 8 mm |
| | Belt width (W13) at center position (O) | | 10.6 mm | 13.4 mm | 4.8 mm |
| Relationship with pulley | Gap (S) | | colspan=3 align=center | 0 mm | |
| | Ratio of gap (S) to height (H13) of belt tooth | | colspan=3 align=center | 0% | |
| Belt strength | | | 2.63 kN/mm | 2.64 kN/mm | 2.63 kN/mm |
| Rust preventability | After 720 hours after salt spray test | Rust of tension members | colspan=3 align=center | There is no rust | |
| | | Belt strength | 2.60 kN/mm | 2.61 kN/mm | 2.61 kN/mm |
| | | Decrease rate of strength | 1% | 1% | 1% |
| | | Rust preventability | A | A | A |
| Running performance | Set tension 7.0 kN | Number of running cycles | 1200000 | 1200000 | 500000 |
| | | Failure of belt | No | No | Tooth chipping |
| | | State of belt tooth portion | A | A | C |
| | | State of belt tooth bottom | A | A | C |
| | | Belt strength (after running) | 2.60 kN/mm | 2.61 kN/mm | 2.58 kN/mm |
| | | Decrease rate of strength | 1% | 1% | 2% |
| | | Determination | A | A | D |
| | Set tension 8.0 kN | Number of running cycles | 1200000 | 1200000 | 300000 |
| | | Failure of belt | No | No | Tooth chipping |
| | | State of belt tooth portion | A | A | C |
| | | State of belt tooth bottom | A | A | C |
| | | Belt strength (after running) | 2.59 kN/mm | 2.61 kN/mm | 2.55 kN/mm |
| | | Decrease rate of strength | 1% | 1% | 3% |
| | | Determination | A | A | D |
| | Set tension 11.2 kN | Number of running cycles | 1200000 | 1200000 | 100000 |
| | | Failure of belt | No | No | Tooth chipping |
| | | State of belt tooth portion | B | B | C |
| | | State of belt tooth bottom | A | A | C |
| | | Belt strength (after running) | 2.51 kN/mm | 2.48 kN/mm | 2.53 kN/mm |
| | | Decrease rate of strength | 5% | 6% | 4% |
| | | Determination | B | B | D |

TABLE 6

|  |  | Ex. 16 | Ex. 21 | Ex. 22 | Ex. 23 |
|---|---|---|---|---|---|
| Tension member 2 | Number of tension members | colspan=4 align=center | 6 | | | |
| | Diameter (D) of each tension member | colspan=4 align=center | 3.3 mm (strands = 84) | | | |
| | Strength of each tension member | colspan=4 align=center | 11 kN | | | |
| | Pitch (P11) of tension members | colspan=4 align=center | 3.9 mm | | | |
| | Interval (d) between tension members | colspan=4 align=center | 0.6 mm | | | |
| | Ratio of total value of intervals (d) to belt width (W) | colspan=4 align=center | 21% | | | |

TABLE 6-continued

| | | | | | | | |
|---|---|---|---|---|---|---|---|
| Thermoplastic elastomer | Kind | | | Polyester polyurethane | Polyether polyurethane | Polyamide | Polyester polyurethane |
| | Hardness (Type D) | | | | 50 | | 30 |
| Reinforcing fabric (inner peripheral surface) | | | | | No | | |
| Thickness of cover layer (inner peripheral side of tension member) | | | | | 0.5 mm | | |
| Type Dimension | Belt width (W) | | | | 25 mm | | |
| | Tooth type | | | | G14M | | |
| | Height (H13) of belt tooth | | | | 6.1 mm | | |
| | Pitch (P13) of belt teeth | | | | 14 mm | | |
| | Belt width (W13) at center position (O) | | | | 7.5 mm | | |
| Relationship with pulley | Gap (S) | | | | 0 mm | | |
| | Ratio of gap (S) to height (H13) of belt tooth | | | | 0% | | |
| Belt strength | | | | 2.65 kN/mm | 2.66 kN/mm | 2.64 kN/mm | 2.64 kN/mm |
| Rust preventability | After 720 hours after salt spray test | Rust of tension members | | | There is no rust | | |
| | | Belt strength | | 2.62 kN/mm | 2.61 kN/mm | 2.59 kN/mm | 2.61 kN/mm |
| | | Decrease rate of strength | | 1% | 2% | 2% | 1% |
| | | Rust preventability | | A | A | A | A |
| Running performance | Set tension 7.0 kN | Number of running cycles | | 1200000 | 1200000 | 1200000 | 1200000 |
| | | Failure of belt | | No | No | No | No |
| | | State of belt tooth portion | | A | A | A | B |
| | | State of belt tooth bottom | | A | A | A | B |
| | | Belt strength (after running) | | 2.63 kN/mm | 2.61 kN/mm | 2.59 kN/mm | 2.62 kN/mm |
| | | Decrease rate of strength | | 1% | 2% | 2% | 1% |
| | | Determination | | A | A | A | B |
| | Set tension 8.0 kN | Number of running cycles | | 1200000 | 1200000 | 1200000 | 1200000 |
| | | Failure of belt | | No | No | No | No |
| | | State of belt tooth portion | | A | A | A | B |
| | | State of belt tooth bottom | | A | A | A | B |
| | | Belt strength (after running) | | 2.63 kN/mm | 2.61 kN/mm | 2.59 kN/mm | 2.61 kN/mm |
| | | Decrease rate of strength | | 1% | 2% | 2% | 1% |
| | | Determination | | A | A | A | B |
| | Set tension 11.2 kN | Number of running cycles | | 1200000 | 1200000 | 1200000 | 1000000 |
| | | Failure of belt | | No | No | No | Tooth chipping |
| | | State of belt tooth portion | | B | B | B | C |
| | | State of belt tooth bottom | | A | B | B | C |
| | | Belt strength (after running) | | 2.49 kN/mm | 2.39 kN/mm | 2.30 kN/mm | 2.49 kN/mm |
| | | Decrease rate of strength | | 6% | 10% | 13% | 6% |
| | | Determination | | B | B | B | C |

| | | | Ex. 24 | Ex. 25 | Ex. 26 |
|---|---|---|---|---|---|
| Tension member 2 | Number of tension members | | | 6 | |
| | Diameter (D) of each tension member | | | 3.3 mm (strands = 84) | |
| | Strength of each tension member | | | 11 kN | |
| | Pitch (P11) of tension members | | | 3.9 mm | |
| | Interval (d) between tension members | | | 0.6 mm | |
| | Ratio of total value of intervals (d) to belt width (W) | | | 21% | |
| Thermoplastic elastomer | Kind | | | Polyester polyurethane | |
| | Hardness (Type D) | | 40 | 60 | 70 |
| Reinforcing fabric (inner peripheral surface) | | | | No | |
| Thickness of cover layer (inner peripheral side of tension member) | | | | 0.5 mm | |
| Type Dimension | Belt width (W) | | | 25 mm | |
| | Tooth type | | | G14M | |
| | Height (H13) of belt tooth | | | 6.1 mm | |
| | Pitch (P13) of belt teeth | | | 14 mm | |
| | Belt width (W13) at center position (O) | | | 7.5 mm | |
| Relationship with pulley | Gap (S) | | | 0 mm | |
| | Ratio of gap (S) to height (H13) of belt tooth | | | 0% | |

TABLE 6-continued

|  |  |  |  |  |  |
|---|---|---|---|---|---|
| | Belt strength | | | 2.64 kN/mm | 2.65 kN/mm | 2.65 kN/mm |
| Rust preventability | After 720 hours after salt spray test | Rust of tension members | | There is no rust | |
| | | Belt strength | 2.61 kN/mm | 2.64 kN/mm | 2.61 kN/mm |
| | | Decrease rate of strength | 1% | 1% | 2% |
| | | Rust preventability | A | A | A |
| Running performance | Set tension 7.0 kN | Number of running cycles | 1200000 | 1200000 | 1200000 |
| | | Failure of belt | No | No | No |
| | | State of belt tooth portion | A | A | A |
| | | State of belt tooth bottom | A | A | A |
| | | Belt strength (after running) | 2.62 kN/mm | 2.64 kN/mm | 2.62 kN/mm |
| | | Decrease rate of strength | 1% | 1% | 1% |
| | | Determination | A | A | A |
| | Set tension 8.0 kN | Number of running cycles | 1200000 | 1200000 | 1200000 |
| | | Failure of belt | No | No | No |
| | | State of belt tooth portion | B | A | B |
| | | State of belt tooth bottom | A | A | B |
| | | Belt strength (after running) | 2.62 kN/mm | 2.63 kN/mm | 2.62 kN/mm |
| | | Decrease rate of strength | 1% | 1% | 1% |
| | | Determination | B | A | B |
| | Set tension 11.2 kN | Number of running cycles | 1200000 | 1200000 | 1200000 |
| | | Failure of belt | No | No | No |
| | | State of belt tooth portion | B | B | B |
| | | State of belt tooth bottom | B | A | B |
| | | Belt strength (after running) | 2.39 kN/mm | 2.50 kN/mm | 2.52 kN/mm |
| | | Decrease rate of strength | 9% | 6% | 5% |
| | | Determination | B | B | B |

TABLE 7

|  |  |  | Comp. Ex 12 | Comp. Ex 13 | Comp. Ex. 14 |
|---|---|---|---|---|---|
| Tension member 3 | Number of tension members | | | 4 | |
| | Diameter (D) of each tension member | | | 4.3 mm (strands = 133) | |
| | Strength of each tension member | | | 22 kN | |
| | Pitch (P11) of tension members | | | 6.0 mm | |
| | Interval (d) between tension members | | | 1.7 mm | |
| | Ratio of total value of intervals (d) to belt width (W) | | | 31% | |
| Thermoplastic elastomer | Kind | | | Polyester polyurethane | |
| | Hardness (Type D) | | | 50 | |
| Reinforcing fabric (inner peripheral surface) | | | | No | |
| Thickness of cover layer (inner peripheral side of tension member) | | | | 0 mm | |
| Type Dimension | Belt width (W) | | | 25 mm | |
| | Tooth type | | | G20M | |
| | Height (H13) of belt tooth | | | 8.75 mm | |
| | Pitch (P13) of belt teeth | | | 20 mm | |
| | Belt width (W13) at center position (O) | | | 10.6 mm | |
| Relationship with pulley | Gap (S) | | 0.5 mm | 0.8 mm | 0 mm |
| | Ratio of gap (S) to height (H13) of belt tooth | | 5.7% | 9.1% | 0% |
| Belt strength | | | 3.66 kN/mm | 3.65 kN/mm | 3.64 kN/mm |
| Rust preventability | After 720 hours after salt spray test | Rust of tension members | | There is rust | |
| | | Belt strength | | 3.38 kN/mm | |
| | | Decrease rate of strength | | 7% | |
| | | Rust preventability | | C | |
| Running performance | Set tension 7.0 kN | Number of running cycles | 1200000 | 1200000 | 1180000 |
| | | Failure of belt | No | No | Tooth bottom wear |

TABLE 7-continued

|  |  |  |  |  |  |
|---|---|---|---|---|---|
|  |  | State of belt tooth portion | B | B | B |
|  |  | State of belt tooth bottom | B | A | C |
|  |  | Belt strength (after running) | 3.61 kN/mm | 3.61 kN/mm | 2.26 kN/mm |
|  |  | Decrease rate of strength | 1% | 1% | 38% |
|  |  | Determination | B | B | C |
|  | Set tension 8.0 kN | Number of running cycles | 1200000 | 1200000 | 1100000 |
|  |  | Failure of belt | No | No | Tooth bottom wear |
|  |  | State of belt tooth portion | B | B | B |
|  |  | State of belt tooth bottom | B | A | C |
|  |  | Belt strength (after running) | 3.61 kN/mm | 3.61 kN/mm | 1.89 kN/mm |
|  |  | Decrease rate of strength | 1% | 1% | 48% |
|  |  | Determination | B | B | C |
|  | Set tension 11.2 kN | Number of running cycles | 1200000 | 1200000 | 1100000 |
|  |  | Failure of belt | No | No | Tooth bottom wear |
|  |  | State of belt tooth portion | B | B | B |
|  |  | State of belt tooth bottom | B | A | C |
|  |  | Belt strength (after running) | 3.61 kN/mm | 3.54 kN/mm | 1.67 kN/mm |
|  |  | Decrease rate of strength | 1% | 3% | 54% |
|  |  | Determination | B | B | C |

|  |  |  | Ex. 27 | Ex. 28 | Ex. 29 |
|---|---|---|---|---|---|
| Tension member 3 | Number of tension members |  | 4 | | |
|  | Diameter (D) of each tension member |  | 4.3 mm (strands = 133) | | |
|  | Strength of each tension member |  | 22 kN | | |
|  | Pitch (P11) of tension members |  | 6.0 mm | | |
|  | Interval (d) between tension members |  | 1.7 mm | | |
|  | Ratio of total value of intervals (d) to belt width (W) |  | 31% | | |
| Thermoplastic elastomer | Kind |  | Polyester polyurethane | | |
|  | Hardness (Type D) |  | 50 | | |
| Reinforcing fabric (inner peripheral surface) |  |  | No | | |
| Thickness of cover layer (inner peripheral side of tension member) |  |  | 0.2 mm | 0.5 mm | 1.0 mm |
| Type Dimension | Belt width (W) |  | 25 mm | | |
|  | Tooth type |  | G20M | | |
|  | Height (H13) of belt tooth |  | 8.75 mm | | |
|  | Pitch (P13) of belt teeth |  | 20 mm | | |
|  | Belt width (W13) at center position (O) |  | 10.6 mm | | |
| Relationship with pulley | Gap (S) |  | 0 mm | | |
|  | Ratio of gap (S) to height (H13) of belt tooth |  | 0% | | |
| Belt strength |  |  | 3.66 kN/mm | 3.67 kN/mm | 3.64 kN/mm |
| Rust preventability | After 720 hours after salt spray test | Rust of tension members | There is no rust | | |
|  |  | Belt strength | 3.60 kN/mm | 3.66 kN/mm | 3.62 kN/mm |
|  |  | Decrease rate of strength | 1% | 1% | 1% |
|  |  | Rust preventability | A | A | A |
| Running performance | Set tension 7.0 kN | Number of running cycles | 1200000 | 1200000 | 1200000 |
|  |  | Failure of belt | No | No | No |
|  |  | State of belt tooth portion | B | A | B |
|  |  | State of belt tooth bottom | B | A | B |
|  |  | Belt strength (after running) | 3.15 kN/mm | 3.63 kN/mm | 3.60 kN/mm |
|  |  | Decrease rate of strength | 14% | 1% | 1% |
|  |  | Determination | B | A | B |
|  | Set tension 8.0 kN | Number of running cycles | 1200000 | 1200000 | 1200000 |
|  |  | Failure of belt | No | No | No |
|  |  | State of belt tooth portion | B | A | B |
|  |  | State of belt tooth bottom | A | A | A |
|  |  | Belt strength (after running) | 2.64 kN/mm | 3.63 kN/mm | 3.60 kN/mm |
|  |  | Decrease rate of strength | 28% | 1% | 1% |
|  |  | Determination | B | A | B |
|  | Set tension 11.2 kN | Number of running cycles | 1200000 | 1200000 | 1200000 |
|  |  | Failure of belt | No | No | No |
|  |  | State of belt tooth portion | B | A | B |
|  |  | State of belt tooth bottom | B | A | B |
|  |  | Belt strength (after running) | 2.46 kN/mm | 3.62 kN/mm | 3.40 kN/mm |
|  |  | Decrease rate of strength | 33% | 1% | 6% |
|  |  | Determination | B | A | B |

TABLE 8

|  |  | Ex. 30 | Ex. 28 | Ex. 31 | Ex. 32 | Ref. Ex. 5 |
|---|---|---|---|---|---|---|
| Tension member 3 | Number of tension members | 3 | 4 | 5 | | 4 |
| | Diameter (D) of each tension member | | | 4.3 mm (strands = 133) | | |
| | Strength of each tension member | | | 22 kN | | |
| | Pitch (P11) of tension members | 7.3 mm | 6.0 mm | 4.9 mm | | 6.0 mm |
| | Interval (d) between tension members | 3.0 mm | 1.7 mm | 0.6 mm | | 1.7 mm |
| | Ratio of total value of intervals (d) to belt width (W) | 48% | 31% | 14% | | 31% |
| Thermoplastic elastomer | Kind | | | Polyester polyurethane | | |
| | Hardness (Type D) | | | 50 | | |
| Reinforcing fabric (inner peripheral surface) | | | | No | | |
| Thickness of cover layer (inner peripheral side of tension member) | | | | 0.5 mm | | |
| Type Dimension | Belt width (W) | | | 25 mm | | |
| | Tooth type | | G20M | | G25M | S8M |
| | Height (H13) of belt tooth | | 8.75 mm | | 10.8 mm | 2.95 mm |
| | Pitch (P13) of belt teeth | | 20 mm | | 25 mm | 8 mm |
| | Belt width (W13) at center position (O) | | 10.6 mm | | 13.4 mm | 4.8 mm |
| Relationship with pulley | Gap (S) | | | 0 mm | | |
| | Ratio of gap (S) to height (H13) of belt tooth | | | 0% | | |
| Belt strength | | 2.75 kN/mm | 3.67 kN/mm | 4.48 kN/mm | 3.66 kN/mm | 3.65 kN/mm |
| Rust preventability | After 720 hours after salt spray test | Rust of tension members | | There is no rust | | |
| | | Belt strength | 2.72 kN/mm | 3.66 kN/mm | 4.44 kN/mm | 3.62 kN/mm | 3.65 kN/mm |
| | | Decrease rate of strength | 1% | 1% | 1% | 1% | 0% |
| | | Rust preventability | A | A | A | A | A |
| Running performance | Set tension 7.0 kN | Number of running cycles | 1200000 | 1200000 | 1200000 | 1200000 | 400000 |
| | | Failure of belt | No | No | No | No | Tooth chipping |
| | | State of belt tooth portion | A | A | A | A | C |
| | | State of belt tooth bottom | A | A | A | A | C |
| | | Belt strength (after running) | 2.73 kN/mm | 3.63 kN/mm | 4.44 kN/mm | 3.62 kN/mm | 3.64 kN/mm |
| | | Decrease rate of strength | 1% | 1% | 1% | 1% | 0% |
| | | Determination | A | A | A | A | D |
| | Set tension 8.0 kN | Number of running cycles | 1180000 | 1200000 | 1200000 | 1200000 | 200000 |
| | | Failure of belt | Tension member breakage | No | No | No | Tooth chipping |
| | | State of belt tooth portion | B | A | A | A | C |
| | | State of belt tooth bottom | B | A | A | A | C |
| | | Belt strength (after running) | — | 3.63 kN/mm | 4.43 kN/mm | 3.62 kN/mm | 3.62 kN/mm |
| | | Decrease rate of strength | — | 1% | 1% | 1% | 1% |
| | | Determination | C | A | A | A | D |
| | Set tension 11.2 kN | Number of running cycles | 1100000 | 1200000 | 1200000 | 1200000 | 100000 |
| | | Failure of belt | Tension member breakage | No | No | No | Tooth chipping |
| | | State of belt tooth portion | B | A | A | A | C |
| | | State of belt tooth bottom | B | A | A | A | C |
| | | Belt strength (after running) | — | 3.62 kN/mm | 4.43 kN/mm | 3.62 kN/mm | 3.62 kN/mm |
| | | Decrease rate of strength | — | 1% | 1% | 1% | 1% |
| | | Determination | C | A | A | A | D |

TABLE 9

|  |  | Ex. 28 | Ex. 33 | Ex. 34 | Ex. 35 |
|---|---|---|---|---|---|
| Tension member 3 | Number of tension members | | | 4 | |
| | Diameter (D) of each tension member | | | 4.3 mm (strands = 133) | |
| | Strength of each tension member | | | 22 kN | |
| | Pitch (P11) of tension members | | | 6.0 mm | |
| | Interval (d) between tension members | | | 1.7 mm | |
| | Ratio of total value of intervals (d) to belt width (W) | | | 31% | |
| Thermoplastic elastomer | Kind | Polyester polyurethane | Polyether polyurethane | Polyamide | Polyester polyurethane |
| | Hardness (Type D) | | | 50 | | 30 |
| Reinforcing fabric (inner peripheral surface) | | | | No | |
| Thickness of cover layer (inner peripheral side of tension member) | | | | 0.5 mm | |
| Type Dimension | Belt width (W) | | | 25 mm | |
| | Tooth type | | | G20M | |

TABLE 9-continued

|  |  |  |  |  |  |  |
|---|---|---|---|---|---|---|
|  | Height (H13) of belt tooth | | 8.75 mm | | | |
|  | Pitch (P13) of belt teeth | | 20 mm | | | |
|  | Belt width (W13) at center position (O) | | 10.6 mm | | | |
| Relationship | Gap (S) | | 0 mm | | | |
| with pulley | Ratio of gap (S) to height (H13) of belt tooth | | 0% | | | |
| Belt strength | | | 3.67 kN/mm | 3.64 kN/mm | 3.65 kN/mm | 3.65 kN/mm |
| Rust preventability | After 720 hours after salt spray test | Rust of tension members | There is no rust | | | |
|  |  | Belt strength | 3.66 kN/mm | 3.60 kN/mm | 3.58 kN/mm | 3.61 kN/mm |
|  |  | Decrease rate of strength | 1% | 1% | 2% | 1% |
|  |  | Rust preventability | A | A | A | A |
| Running performance | Set tension 7.0 kN | Number of running cycles | 1200000 | 1200000 | 1200000 | 1200000 |
|  |  | Failure of belt | No | No | No | No |
|  |  | State of belt tooth portion | A | A | A | B |
|  |  | State of belt tooth bottom | A | A | A | B |
|  |  | Belt strength (after running) | 3.63 kN/mm | 3.49 kN/mm | 3.58 kN/mm | 3.57 kN/mm |
|  |  | Decrease rate of strength | 1% | 2% | 2% | 2% |
|  |  | Determination | A | A | A | B |
|  | Set tension 8.0 kN | Number of running cycles | 1200000 | 1200000 | 1200000 | 1200000 |
|  |  | Failure of belt | No | No | No | No |
|  |  | State of belt tooth portion | A | A | A | B |
|  |  | State of belt tooth bottom | A | A | A | B |
|  |  | Belt strength (after running) | 3.63 kN/mm | 3.49 kN/mm | 3.54 kN/mm | 3.56 kN/mm |
|  |  | Decrease rate of strength | 1% | 2% | 3% | 2% |
|  |  | Determination | A | A | A | B |
|  | Set tension 11.2 kN | Number of running cycles | 1200000 | 1200000 | 1200000 | 1000000 |
|  |  | Failure of belt | No | No | No | Tooth chipping |
|  |  | State of belt tooth portion | A | A | A | C |
|  |  | State of belt tooth bottom | A | A | A | C |
|  |  | Belt strength (after running) | 3.62 kN/mm | 3.53 kN/mm | 3.54 kN/mm | 2.99 kN/mm |
|  |  | Decrease rate of strength | 1% | 3% | 3% | 18% |
|  |  | Determination | A | A | A | C |

|  |  |  | Ex. 36 | Ex. 37 | Ex. 38 |
|---|---|---|---|---|---|
| Tension member 3 | Number of tension members | | 4 | | |
|  | Diameter (D) of each tension member | | 4.3 mm (strands = 133) | | |
|  | Strength of each tension member | | 22 kN | | |
|  | Pitch (P11) of tension members | | 6.0 mm | | |
|  | Interval (d) between tension members | | 1.7 mm | | |
|  | Ratio of total value of intervals (d) to belt width (W) | | 31% | | |
| Thermoplastic elastomer | Kind | | Polyester polyurethane | | |
|  | Hardness (Type D) | | 40 | 60 | 70 |
| Reinforcing fabric (inner peripheral surface) | | | No | | |
| Thickness of cover layer (inner peripheral side of tension member) | | | 0.5 mm | | |
| Type | Belt width (W) | | 25 mm | | |
| Dimension | Tooth type | | G20M | | |
|  | Height (H13) of belt tooth | | 8.75 mm | | |
|  | Pitch (P13) of belt teeth | | 20 mm | | |
|  | Belt width (W13) at center position (O) | | 10.6 mm | | |
| Relationship | Gap (S) | | 0 mm | | |
| with pulley | Ratio of gap (S) to height (H13) of belt tooth | | 0% | | |
| Belt strength | | | 3.65 kN/mm | 3.66 kN/mm | 3.65 kN/mm |
| Rust preventability | After 720 hours after salt spray test | Rust of tension members | There is no rust | | |
|  |  | Belt strength | 3.61 kN/mm | 3.65 kN/mm | 3.61 kN/mm |
|  |  | Decrease rate of strength | 1% | 1% | 1% |
|  |  | Rust preventability | A | A | A |
| Running performance | Set tension 7.0 kN | Number of running cycles | 1200000 | 1200000 | 1200000 |
|  |  | Failure of belt | No | No | No |
|  |  | State of belt tooth portion | A | A | A |
|  |  | State of belt tooth bottom | A | A | A |
|  |  | Belt strength (after running) | 3.54 kN/mm | 3.65 kN/mm | 3.61 kN/mm |
|  |  | Decrease rate of strength | 2% | 1% | 1% |
|  |  | Determination | A | A | A |
|  | Set tension 8.0 kN | Number of running cycles | 1200000 | 1200000 | 1200000 |
|  |  | Failure of belt | No | No | No |

TABLE 9-continued

| | | | | | |
|---|---|---|---|---|---|
| | | State of belt tooth portion | A | A | A |
| | | State of belt tooth bottom | A | A | A |
| | | Belt strength (after running) | 3.50 kN/mm | 3.63 kN/mm | 3.61 kN/mm |
| | | Decrease rate of strength | 4% | 1% | 1% |
| | | Determination | A | A | A |
| | Set tension 11.2 kN | Number of running cycles | 1200000 | 1200000 | 1200000 |
| | | Failure of belt | No | No | No |
| | | State of belt tooth portion | B | A | B |
| | | State of belt tooth bottom | B | A | B |
| | | Belt strength (after running) | 3.51 kN/mm | 3.63 kN/mm | 3.59 kN/mm |
| | | Decrease rate of strength | 4% | 1% | 2% |
| | | Determination | B | A | B |

15

TABLE 10

| | | | Example 39 |
|---|---|---|---|
| Tension member 4 | Number of tension members | | 4 |
| | Diameter (D) of each tension member | | 6.4 mm (strands = 133) |
| | Strength of each tension member | | 36 kN |
| | Pitch (P11) of tension members | | 8.1 mm |
| | Interval (d) between tension members | | 1.7 mm |
| | Ratio of total value of intervals (d) to belt width (W) | | 27% |
| Thermoplastic elastomer | Kind | | Polyester polyurethane |
| | Hardness (Type D) | | 50 |
| Reinforcing fabric (inner peripheral surface) | | | No |
| Thickness of cover layer (inner peripheral side of tension member) | | | 0.5 mm |
| Type Dimension | Belt width (W) | | 35 mm |
| | Tooth type | | G20M |
| | Height (H13) of belt tooth | | 8.75 mm |
| | Pitch (P13) of belt teeth | | 20 mm |
| | Belt width (W13) at center position (0) | | 10.6 mm |
| Relationship with pulley | Gap (S) | | 0 mm |
| | Ratio of gap (S) to height (H13) of belt tooth | | 0% |
| | Belt strength | | 4.11 kN/mm |
| Rust preventability | After 720 hours after salt spray test | Rust of tension members | There is no rust |
| | | Belt strength | 4.07 kN/mm |
| | | Decrease rate of strength Rust preventability | 1% |
| Running performance | Set tension 7.0 kN | Number of running cycles | 1200000 |
| | | Failure of belt | No |
| | | State of belt tooth portion | A |
| | | State of belt tooth bottom | A |
| | | Belt strength (after running) | 4.07 kN/mm |
| | | Decrease rate of strength | 1% |
| | | Determination | A |
| | Set tension 8.0 kN | Number of running cycles | 1200000 |
| | | Failure of belt | No |
| | | State of belt tooth portion | A |
| | | State of belt tooth bottom | A |
| | | Belt strength (after running) | 4.07 kN/mm |
| | | Decrease rate of strength | 1% |
| | | Determination | A |
| | Set tension 11.2 kN | Number of running cycles | 12000000 |
| | | Failure of belt | No |
| | | State of belt tooth portion | A |
| | | State of belt tooth bottom | A |
| | | Belt strength (after running) | 4.07 kN/mm |
| | | Decrease rate of strength | 1% |
| | | Determination | A |

TABLE 11

|  |  | Example 40 | Example 41 | Reference Example 6 |
|---|---|---|---|---|
| Tension member 5 | Number of tension members | 9 | 10 | 11 |
|  | Diameter (D) of each tension member | | 1.6 mm (strands = 49) | |
|  | Strength of each tension member | | 3.0 kN | |
|  | Pitch (P11) of tension members | 2.1 mm | 1.8 mm | 1.6 mm |
|  | Interval (d) between tension members | 0.5 mm | 0.2 mm | 0.0 mm |
|  | Ratio of total value of intervals (d) to belt width (W) | 28% | 20% | 12% |
| Thermoplastic elastomer | Kind | | Polyester polyurethane | |
|  | Hardness (Type D) | | 50 | |
| Reinforcing fabric (inner peripheral surface) | | | No | |
| Thickness of cover layer (inner peripheral side of tension member) | | | 0.5 mm | |
| Type | Belt width (W) | | 20 mm | |
| Dimension | Tooth type | | G14M | |
|  | Height (H13) of belt tooth | | 6.1 mm | |
|  | Pitch (P13) of belt teeth | | 14 mm | |
|  | Belt width (W13) at center position (0) | | 7.5 mm | |
| Relationship with pulley | Gap (S) | | 0 mm | |
|  | Ratio of gap (S) to height (H13) of belt tooth | | 0% | |
|  | Belt strength | 1.35 kN/mm | 1.50 kN/mm | 1.65 kN/mm |
| Rust preventability | After 720 hours after salt spray test | Rust of tension members | | There is no rust | |
|  |  | Belt strength | 1.34 kN/mm | 148 kN/mm | 1.61 kN/mm |
|  |  | Decrease rate of strength | 1% | 1% | 2% |
|  |  | Rust preventability | A | A | A |
| Running performance | Set tension 7.0 kN | Number of running cycles | 1200000 | 1200000 | 700000 |
|  |  | Failure of belt | No | No | belt cut in round slice |
|  |  | State of belt tooth portion | B | B | B |
|  |  | State of belt tooth bottom | B | A | B |
|  |  | Belt strength (after running) | 1.21 kN/mm | 1.39 kN/mm | — |
|  |  | Decrease rate of strength | 10% | 7% | — |
|  |  | Determination | B | B | D |
|  | Set tension 8.0 kN | Number of running cycles | 1200000 | 1200000 | 500000 |
|  |  | Failure of belt | No | No | belt cut in round slice |
|  |  | State of belt tooth portion | B | B | B |
|  |  | State of belt tooth bottom | B | A | B |
|  |  | Belt strength (after running) | 0.94 kN/mm | 1.20 kN/mm | — |
|  |  | Decrease rate of strength | 30% | 20% | — |
|  |  | Determination | B | B | D |
|  | Set tension 11.2 kN | Number of running cycles | 1000000 | 1000000 | 100000 |
|  |  | Failure of belt | Tension member breakage | Tension member breakage | belt cut in round slice |
|  |  | State of belt tooth portion | B | B | B |
|  |  | State of beit tooth bottom | B | B | B |
|  |  | Belt strength (after running) | — | — | — |
|  |  | Decrease rate of strength | — | — | — |
|  |  | Determination | C | C | D |

[Materials Used]

Thermoplastic elastomer 1: polyester polyurethane-based thermoplastic elastomer [Desmopan 3055DU produced by Covestro]

Thermoplastic elastomer 2: polyether polyurethane-based thermoplastic elastomer [Desmopan 9852DU produced by Covestro]

Thermoplastic elastomer 3: polyamide-based thermoplastic elastomer [TPAE-617C produced by T&K TOKA]

Tension member 1: steel cord, 84 strands, diameter: 2.5 mm, strength: 7.2 kN

Tension member 2: steel cord, 84 strands, diameter: 3.3 mm, strength: 11 kN

Tension member 3: steel cord, 133 strands, diameter: 4.3 mm, strength: 22 kN

Tension member 4: steel cord, 133 strands, diameter: 6.4 mm, strength: 36 kN

Tension member 5: steel cord, 49 strands, diameter: 1.6 mm, strength: 3.0 kN

[Verification Method]

(Strength of Toothed Belt)

A test piece was sampled from each of the toothed belts according to Examples 1 to 41, Comparative Examples 1 to 14, and Reference Examples 1 to 6, a tensile test (tensile speed: 50 mm/min) was performed on each test piece using an Amsler tensile test machine to measure the strength (strength at break) at which the toothed belt was broken, and the strength at break per unit width was calculated as the belt strength (kN/mm). The dimensions of the test pieces were 20 mm in width and 500 mm in length in each of Examples 1 to 13, 40, and 41, Comparative Examples 1 to 8, and Reference Examples 1, 2, and 6, and were 25 mm in width and 500 mm in length in each of Examples 14 to 38, Comparative Examples 9 to 14, and Reference Example 3 to 5. In Example 39, the width was 35 mm, and the length was 500 mm.

(Rust Preventability)

In order to check the rust preventability of the toothed belts according to Examples 1 to 41, Comparative Examples 1 to 14, and Reference Examples 1 to 6, a salt spray test was performed. Since the toothed belts in Comparative Examples 1 to 4 were the same, the toothed belt in Comparative Example 4 was used as a sample as a representative. Similarly, the toothed belt in Comparative Example 8 as a representative of Comparative Examples 5 to 8, the toothed belt in Comparative Example 11 as a representative of Comparative Examples 9 to 11, and the toothed belt in Comparative Example 14 as a representative of Comparative Examples 12 to 14 were used as samples.

A test piece for appearance checking and a test piece for belt strength measurement were sampled from each of the toothed belts produced in Examples 1 to 41, Comparative Examples 4, 8, 11, and 14, and Reference Examples 1 to 6, a salt spray test was performed on each test piece according to a neutral salt damage test method defined by ISO 9227-2012, and an appearance (occurrence of rust) after 720 hours was checked. The belt strength (strength at break) after the elapse of 720 hours was measured, and a decrease rate of the strength relative to a belt strength before the test was calculated (see the items of "Belt strength" and "Decrease rate of strength" in Tables 1 to 11).

In the evaluation of "rust preventability" in Tables 1 to 11, "A" means that no rust was generated, "B" means that rust was generated to the extent that any problem was not caused in practical durability life (decrease rate of strength: 5% or less), and "C" means that rust was remarkably generated to the extent that practical use was impossible (decrease rate of strength: more than 5%).

The salt spray test was performed using a 5% NaCl solution (pH value: 6.5 to 7.2) at a condition of a temperature of 35° C.±2° C. The dimensions of the test pieces for appearance checking were 20 mm in width and 50 mm in length in each of Examples 1 to 13, 40, and 41, Comparative Examples 1 to 8, and Reference Examples 1, 2, and 6, and were 25 mm in width and 50 mm in length in each of Examples 14 to 38, Comparative Examples 9 to 14, and Reference Example 3 to 5. In Example 39, the width was 35 mm, and the length was 50 mm.

The dimensions of the test piece for belt strength measurement were 20 mm in width and 750 mm in length in Examples 1 to 13, 40, and 41, Comparative Examples 1 to 8, and Reference Examples 1, 2, and 6, and were 25 mm in width and 750 mm in length in Examples 14 to 38, Comparative Examples 9 to 14, and Reference Example 3 to 5. In Example 39, the width was 35 mm, and the length was 750 mm.

(Running Performance)

A test piece 10x was sampled from each of the toothed belts according to Examples 1 to 41, Comparative Examples 4, 8, 11, and 14, and Reference Examples 1 to 6, and as shown in FIG. 6, a weight 71 and a weight 72 were suspended from both ends of the test piece 10x, and the test piece 10x was wound around a drive pulley 73, a driven pulley 74, and a flat pulley 75 (diameter=160 mm) of a running test machine 70. Then, running was performed repeatedly for 1,200,000 cycles (one round trip in the direction of the arrow shown in FIG. 6 is defined as one cycle) at a predetermined running distance, and states of the belt tooth and the belt tooth bottom after the running test were evaluated (see the items of "state of belt tooth" and "state of belt tooth bottom" in Tables 1 to 11). In the evaluation of the "state of belt tooth" and the "state of belt tooth bottom" in Tables 1 to 11, "A" means that there was no wear, "B" means that wear was generated to the extent that any problem was not caused in practical durability life, and "C" means that wear was remarkably generated to the extent that practical use was impossible.

The belt strength (strength at break) after the running test was measured, and the decrease rate of the strength relative to the belt strength before the running test was calculated (see the items of "belt strength (after running)" and "decrease rate of strength" in Tables 1 to 11).

In the case where the belt reached a failure state in which the belt was unable to run before reaching 1,200,000 cycles, it was determined that the life was reached, and the running test was terminated (see the item of "failure of belt" in Tables 1 to 11).

In the above running test, the tension applied to each toothed belt was changed in three levels (7.0 kN, 8.0 kN, and 11.2 kN), and the durability of each toothed belt was compared from the condition of a low tension to the condition of a high tension. The level of the tension was set by changing the loads of the weight 71 and the weight 72 as shown in Table 12 below. In each level, the number of teeth of the drive pulley 73 and the driven pulley 74 and the moving distance in one cycle were changed.

TABLE 12

| | Set tension (kN) | Load (kN) | | Number of teeth on pulley | Moving distance (mm) |
|---|---|---|---|---|---|
| | | Weight 71 | Weight 72 | | |
| Level 1 | 7.0 | 1.25 | 7.00 | 44 | 1000 |
| Level 2 | 8.0 | 1.43 | 8.00 | 56 | 1000 |
| Level 3 | 11.2 | 2.00 | 11.2 | 56 | 2000 |

From the results of the running test, the toothed belts according to Examples 1 to 41, Comparative Examples 4, 8, 11, and 14, and Reference Examples 1 to 6 were ranked by A to D based on the criteria shown in the following Table 13, and the ranks A to D were described in the item of "determination" in Tables 1 to 11. Among the ranks A to D, the toothed belts having the ranks A and B in which 1,200,000 cycles were completed and no significant failure occurred were products that can be practically used at an excellent level, and the toothed belts having the rank C in which running of 1,000,000 cycles or more was possible were also positioned as products that can be practically used (acceptable level) depending on the use conditions.

TABLE 13

| Rank | Determination criteria |
|---|---|
| A | After 1,200,000 cycles were completed, both the state of the "belt tooth" and the state of the "belt tooth bottom" after running were good (determination: A), and the decrease rate of strength after running was 5% or less. |
| B | After 1,200,000 cycles were completed, at least one of the "belt tooth" and the "belt tooth bottom" after running was slightly worn (determination B: level at no problem in durability life). |
| C | (C-1) After 1,200,000 cycles were completed, at least one of the "belt tooth" and the "belt tooth bottom" after running was significantly worn (determination C: not practical) (C-2) A failure (life) occurred before reaching 1,200,000 cycles, but running of 1,000,000 cycles or more was possible. |
| D | Failure (life) occurred before reaching 1,000,000 cycles. |

[Verification Results]
<Comparative Verification in Table 1>

Table 1 shows configurations of toothed belts in Examples 1 to 3 and Comparative Examples 1 to 8 in order to compare a toothed belt having a scale equivalent to the toothed belt described in Patent Literature 4 (pitch of belt teeth: 14 mm, belt width: 20 mm, tooth type: G14M, see FIG. 7) and using the equivalent tension member 1 (diameter D=2.5 mm, strength: 7.2 kN) with (A) a toothed belt power-transmission device (Examples 1, 3, 6, and 20 to 22 of Patent Literature 4) using a toothed belt in which a tension member is located at a position in contact with a surface of a tooth bottom portion (or a reinforcing fabric) and having a gap S between a tip of a pulley tooth and a belt tooth bottom, (B) a toothed belt power-transmission device using a toothed belt in which a cover layer is provided on an inner peripheral side of a tension member, and the gap S is not provided so that a belt tooth bottom comes into contact with a pulley tooth, and (C) a toothed belt power-transmission device using a toothed belt having the same configuration as the toothed belt of the above (A) except that the gap S is not provided so that the belt tooth bottom comes into contact with the pulley tooth.

Examples 1 to 3

The toothed belt power-transmission devices in Examples 1 to 3 have the mode of the toothed belt of the above (B) in which the cover layer is provided on the inner peripheral side of the tension member, and the gap S is not provided so that the belt tooth bottom comes into contact with the pulley tooth. In the above toothed belt power-transmission devices, the thickness of the cover layer is changed to 0.2 mm (Example 1), 0.5 mm (Example 2), and 0.8 mm (Example 3). In any toothed belt, no rust was generated in the tension member in the salt spray test, the decrease in the belt strength was small, and the rust preventability was excellent. Regarding the running performance, in Examples 1 and 3, the ranks were B under the condition that the set tension was low (7.0 kN, 8.0 kN), and the ranks were C under the high tension (11.2 kN) condition. In contrast, in Example 2, the rank was A under the low tension (7.0 kN) condition, and the rank was B even under the high tension (8.0 kN, 11.2 kN) condition.

That is, a toothed belt having a cover layer with a thickness of 0.5 mm can be practically used even under the highest tension (11.2 kN) condition, and a toothed belt having a cover layer with a thickness of 0.2 mm or 0.8 mm can be practically used up to a high tension condition of about 8 kN, but cannot be practically used under the highest tension (11.2 kN) condition. From this result, the thickness of the cover layer is preferably about 0.5 mm (about 0.4 to 0.6 mm). In particular, when the thickness of the cover layer is small under a high tension condition, the tension member is exposed to the belt tooth bottom during running due to wear of the cover layer, the wear of the tension member progresses, and the tension member is likely to be broken. On the other hand, when the thickness of the cover layer is large, the belt teeth are likely to intensively receive a stress (tooth load) applied to the toothed belt, and a failure due to a tooth chipping is likely to occur.

The toothed belt power-transmission devices in Examples 1 to 3 could be adapted to power-transmission under a high tension condition, and had a mode advantageous in power-transmission performance and durability of a tooth portion.

Comparative Examples 1 to 4

The toothed belts in Comparative Examples 1 to 4 had a mode in which the cover layer on the inner peripheral side of the tension member (steel cord) is not provided, and an inner peripheral surface including the belt tooth bottom is covered with the reinforcing fabric. In these toothed belts, the tension member is located at a position in contact with the surface of the belt tooth bottom (reinforcing fabric). In the salt spray test, rust was generated in the tension member, a decrease in the belt strength was also observed, and no rust preventability was obtained. In these toothed belts, the tension member is not exposed to the surface of the belt tooth bottom due to the reinforcing fabric, but rust occurred on the tension member (steel cord) since the tension member is in contact with the reinforcing fabric having absorbed moisture. The toothed belt having this mode is disadvantageous in rust preventability of tension members against salt water (moisture).

The toothed belt power-transmission devices in Comparative Examples 1 to 3 correspond to Examples 1, 3, and 6 of Patent Literature 4, and have a mode in which the toothed belt of the above (A) in which the tension member is in contact with the surface of the tooth bottom portion (reinforcing fabric) is used, and the gap S between the tip of the pulley tooth and the belt tooth bottom is provided. In the above toothed belt power-transmission devices, the gap S is changed to 0.25 mm (Comparative Example 1), 0.5 mm (Comparative Example 2), and 0.8 mm (Comparative Example 3). Regarding the running performance, the rank was A or B under the low tension (7.0 kN) condition in all cases, and the rank was C under the condition of the tension of 8.0 kN in Comparative Example 3 in which the gap S was large, and the rank was D in all cases with early failure (tooth chipping) under the highest tension (11.2 kN) condition.

That is, in a mode in which the gap S is provided between the tip of the pulley tooth and the belt tooth bottom, the toothed belt can be practically used under a low tension (about 7.0 kN) condition, but the toothed belt cannot be practically used under the condition of a high tension of 8.0 kN when the gap S is large, and the toothed belt cannot be practically used under the highest tension (11.2 kN) condition regardless of the size of the gap S. From this result, in a mode in which the gap S is provided between the tip of the pulley tooth and the belt tooth bottom, the belt tooth bottom does not come into contact with the pulley tooth when meshing with the pulley tooth, so that the belt tooth intensively receives the stress applied to the toothed belt (the stress is dispersed to the belt tooth and the belt tooth bottom in the case where the belt tooth bottom comes into contact with the pulley tooth). Therefore, particularly under a high tension condition, the stress applied to the belt teeth becomes particularly large, leading to a failure due to tooth chipping at an early stage. Such a method in which the belt tooth bottom does not come into contact with the pulley tooth (tooth tip power-transmission method) cannot follow power-transmission under a high tension condition, and can be said to be a mode disadvantageous in power-transmission performance and durability of the tooth portion.

The toothed belt power-transmission device in Comparative Example 4 corresponds to Comparative Example 1 of Patent Literature 4, and is a mode in which the toothed belt of the above (C) in which the tension member is in contact with the surface of the tooth bottom portion (reinforcing fabric) is used, and the gap S is not provided between the tip of the pulley tooth and the belt tooth bottom (the belt tooth bottom is in contact with the pulley tooth). Regarding the running performance, the rank was C due to the wear of the belt tooth bottom even under a low tension (7.0 kN) condition, and the rank was D with an early failure (tension member breakage) under a higher tension condition. In this mode, the cover layer is not provided on the inner peripheral side of the tension member and only the reinforcing fabric is disposed, and the belt tooth bottom comes into contact with the pulley tooth, so that the tension member is exposed to the belt tooth bottom during running due to the wear of the reinforcing fabric, and the wear of the tension member progresses to cause breakage of the tension member.

Comparative Examples 5 to 8

The toothed belts of Comparative Examples 5 to 8 have a mode in which neither the cover layer nor the reinforcing fabric is provided on the inner peripheral side of the tension member (steel cord), and the tension member is located at a position in contact with the surface of the belt tooth bottom. In the salt spray test, rust was generated in the tension member, a decrease in the belt strength was also observed, and no rust preventability was obtained. In these toothed belts, a part of the tension member is in contact with the surface of the belt tooth bottom, and thus rust is generated in the tension member (steel cord) due to moisture attached to the surface of the belt tooth bottom. The toothed belt having this mode is disadvantageous in rust preventability of tension members against salt water (moisture).

The toothed belt power-transmission devices of Comparative Examples 5 to 7 correspond to Examples 20 to 22 of Patent Literature 4, and have a mode in which the toothed belt of the above (A) in which the tension member is located at a position in contact with the surface of the tooth bottom portion is used, and the gap S is provided between the tip of the pulley tooth and the belt tooth bottom. In the above toothed belt power-transmission devices, the gap S is changed to 0.25 mm (Comparative Example 5), 0.5 mm (Comparative Example 6), and 0.8 mm (Comparative Example 7). Regarding the running performance, the rank was A or B under the low tension (7.0 kN) condition in all cases, and the rank was C under the condition of the tension of 8.0 kN in Comparative Example 7 in which the gap S was large, and the rank was D in all cases with an early failure (tooth chipping) under the highest tension (11.2 kN) condition.

As described above, it is found from these results that, in the mode in which the gap S is provided between the tip of the pulley tooth and the belt tooth bottom, the toothed belt can be practically used under the low tension (about 7.0 kN) condition, but the toothed belt cannot be practically used under the condition of a high tension of 8.0 kN when the gap S is large, and the toothed belt cannot be practically used under the highest tension (11.2 kN) condition regardless of the size of the gap S. Such a method in which the belt tooth bottom does not come into contact with the pulley tooth (tooth tip power-transmission method) cannot follow power-transmission under a high tension condition, and can be said to be a mode disadvantageous in power-transmission performance and durability of the belt tooth.

The toothed belt power-transmission device in Comparative Example 8 corresponds to Comparative Example 2 of Patent Literature 4, and has a mode in which the toothed belt of the above (C) in which the tension member is located at a position in contact with the surface of the tooth bottom portion is used, and the gap S is not provided between the tip of the pulley tooth and the belt tooth bottom (the belt tooth bottom comes into contact with the pulley tooth). Regarding the running performance, the rank was C due to the wear of the belt tooth bottom even under a low tension (7.0 kN) condition, and the rank was D with an early failure (tension member breakage) under a higher tension condition. In this mode, neither the cover layer nor the reinforcing fabric is provided on the inner peripheral side of the tension member, and the belt tooth bottom portion comes into contact with the pulley tooth. Therefore, the wear of the tension member exposed to the belt tooth bottom progressed during running, and thus the tension member was broken.

<Comparative Verification in Table 2>

Table 2 shows configurations of the toothed belts of Examples 2, 4, and 5 and Reference Example 1 in order to compare the cases where the pitches of the tension members in the toothed belt of Example 2 (the pitch of the tension members: 3.2 mm, the number of the tension members: 6, and the belt strength: 2.18 kN/mm) are changed to 2.5 mm (Reference Example 1), 2.8 mm (Example 5), and 4.0 mm (Example 4). Table 2 also shows configurations of the toothed belts in Examples 6 and 7 in which the belt strength (the configuration and array density of the tension members) is equivalent to that of Example 2 and the scale of the belt tooth is larger than that of Example 2. Further, Table 2 also shows a configuration of the toothed belt in Reference Example 2 in which the belt strength (the configuration and the array density of the tension members) is equivalent to that of Example 2 but the scale of the belt teeth is smaller than that of Example 2.

Examples 4 and 5 and Reference Example 1

In Example 5 in which the pitch of tension members was smaller than that of Example 2 and the number of tension members was increased to seven (the density of the tension member array was increased), the belt strength was increased (belt strength: 2.53 kN/mm).

On the other hand, in Example 4 in which the pitch of tension members was larger than that of Example 2 and the number of tension members was decreased to five (the density of the tension member array was decreased), the belt strength was decreased (belt strength: 1.18 kN/mm).

Also in the toothed belts in Examples 4 and 5, no rust was generated in the tension member in the salt spray test, the decrease in the belt strength was small, and the rust preventability was excellent. Regarding the running performance, in Example 5, the rank was A under the low tension (7.0 kN) condition, and the rank was B under the high tension (8.0 kN, 11.2 kN) condition as in Example 2. In Example 4, the rank was B under the low tension (7.0 kN, 8.0 kN) condition, and the rank was C under the high tension (11.2 kN) condition due to occurrence of tension member breakage before reaching 1,200,000 cycles (1,000,000 cycles). Both the Examples were practical levels depending on the use conditions.

In Reference Example 1 in which the pitch of tension members was reduced to the limit and the tension members were arrayed without gaps, the belt strength was most increased (belt strength: 2.88 kN/mm), but the running performance was ranked D for an early failure (belt cut in round slice) under any tension condition. When the interval d between adjacent tension members is 0, the thermoplastic elastomer does not flow between the tension members, and the periphery of the tension members is not held by the thermoplastic elastomer. Therefore, when the belt runs, the adjacent tension members were separated from each other, and the belt was cut in round slice.

It was confirmed from the above results that the toothed belt can be practically used when the pitch of the tension members is in the range of 2.8 mm to 4.0 mm and the belt strength per 1 mm of the belt width is in the range of 1.18 kN/mm to 2.53 kN/mm.

Examples 6 and 7

In Examples 6 and 7, the scales of the belt teeth were respectively changed to scales corresponding to tooth pitches of 20 mm (tooth type: G20M) and 25 mm (tooth type: G25M) as compared with the toothed belt in Example 2 having a tooth pitch of 14 mm (tooth type: G14M).

Also in the toothed belts in Examples 6 and 7, no rust was generated in the tension member in the salt spray test, the decrease in the belt strength was small, and the rust preventability was excellent. Regarding the running performance, the rank was A under the low tension (7.0 kN) condition, and the rank was B under the high tension (8.0 kN, 11.2 kN) condition as in Example 2.

Reference Example 2

In Reference Example 2, the scale of the belt teeth was changed to a scale corresponding to a tooth pitch of 8 mm (tooth type: S8M) as compared with the toothed belt in Example 2 having a tooth pitch of 14 mm (tooth type: G14M). That is, this is an example in which the same tension members as in Example 2 are arrayed to maintain the same belt strength, but the scale of the belt teeth is small.

Also in the toothed belt of Reference Example 2, no rust was generated in the tension member in the salt spray test, the decrease in the belt strength was small, and the rust preventability was excellent. However, regarding the running performance, the rank was D (cannot be practically used) due to an early failure (tooth chipping) under the low tension (7.0 kN) condition.

Therefore, in the practical use, the scale of the belt teeth is preferably a tooth pitch of 14 mm or more.

<Comparative Verification in Table 3>

Table 3 shows configurations of the toothed belts in Examples 2, 8, and 9 in order to compare cases where the thermoplastic elastomer in the toothed belt in Example 2 is changed from polyester polyurethanes to polyether polyurethanes (Example 8) and polyamides (Example 9).

Table 3 shows configurations of the toothed belts in Examples 2 and 10 to 13 in order to compare cases where the hardness of the polyester polyurethane-based thermoplastic elastomer in the toothed belt in Example 2 is changed from 50° to 30° (Example 10), 40° (Example 11), 60° (Example 12), and 70° (Example 13).

Examples 8 and 9

In Example 8 in which the polyester polyurethane-based thermoplastic elastomer in the toothed belt in Example 2 was changed to polyether polyurethanes and Example 9 in which the polyester polyurethane-based thermoplastic elastomer in the toothed belt in Example 2 was changed to polyamides, the belt strength was equivalent to that of Example 2. Also in the toothed belts of Examples 8 and 9, no rust was generated in the tension member in the salt spray test, the decrease in the belt strength was small, and the rust preventability was excellent. Regarding the running performance, the rank was A under the low tension (7.0 kN) condition, and the rank was B under the high tension (8.0 kN, 11.2 kN) condition as in Example 2.

Examples 10 to 13

In Examples 10 and 11 in which the hardness of the thermoplastic elastomer was lower than that of Example 2 and in Examples 12 and 13 in which the hardness was higher than that of Example 2, the belt strength was equivalent to that of Example 2. Also in the toothed belts of Examples 10 to 13, no rust was generated in the tension member in the salt spray test, the decrease in the belt strength was small, and the rust preventability was excellent.

Regarding the running performance, in Example 12 in which the hardness was increased, the rank was A under the low tension (7.0 kN) condition, and the rank was B under the high tension (8.0 kN, 11.2 kN) condition as in Example 2. In Example 13 in which the hardness was further higher, the rank was B from the condition of a low tension (7.0 kN) to the condition of a high tension (11.2 kN). On the other hand, in Example 11 in which the hardness was reduced, the rank was B from the condition of a low tension (7.0 kN) to the condition of a high tension (11.2 kN). In Example 10 in which the hardness was further lower, the rank was B under the low tension (7.0 kN, 8.0 kN) condition, and the rank was C due to occurrence of the tooth chipping in 1,000,000 cycles under the high tension (11.2 kN) condition. All of these Examples were practical levels depending on the use conditions.

<Comparative Verification in Table 4>

Table 4 shows configurations of the toothed belts in Examples 14 to 17 and Comparative Examples 9 to 11 in order to compare the above (A) to (C) with a toothed belt (tooth type: G14M, see FIG. 7), which uses the tension member 2 (diameter D=3.3 mm, strength: 11 kN) with a pitch of belt teeth of 14 mm and a belt width of 25 mm, as a toothed belt having a specification higher in strength than the toothed belt described in Patent Literature 4.

Examples 14 to 17

The toothed belt power-transmission devices in Examples 14 to 17 have the mode of the toothed belt of the above (B) in which the cover layer is provided on the inner peripheral side of the tension member, and the gap S is not provided so that the belt tooth bottom is in contact with the pulley teeth, and the thickness of the cover layer is changed to 0.2 mm (Example 14), 0.3 mm (Example 15), 0.5 mm (Example 16), and 0.8 mm (Example 17). In any toothed belt, no rust was generated in the tension member in the salt spray test, the decrease in the belt strength was small, and the rust preventability was excellent. Regarding the running performance, the rank was B in each of Examples 14 and 17 from the condition of a low tension (7.0 kN) to the condition of a high tension (11.2 kN). In contrast, in Examples 15 and 16, the rank was A under the low tension (7.0 kN, 8.0 kN) condition, and the rank was B even under the high tension (11.2 kN) condition.

That is, not only the toothed belt having a cover layer with a thickness of 0.5 mm but also the toothed belt having a cover layer with a thickness of 0.2 mm or 0.8 mm can be practically used up to the highest tension (11.2 kN) condition. In particular, a toothed belt having a cover layer with a thickness of about 0.3 mm to 0.5 mm (about 0.25 mm to 0.6 mm) is preferable. The toothed belt power-transmission devices in Examples 14 to 17 can be adapted to power-transmission under a high tension condition, and have a mode advantageous in power-transmission performance and durability of the tooth portion.

Comparative Examples 9 to 11

The toothed belts in Comparative Examples 9 to 11 have a mode in which neither the cover layer nor the reinforcing fabric is provided on the inner peripheral side of the tension member (steel cord), and the tension member is located at a position in contact with the surface of the belt tooth bottom. In the salt spray test, rust was generated in the tension member, a decrease in the belt strength was also observed, and no rust preventability was obtained.

The toothed belt power-transmission devices in Comparative Examples 9 and 10 have the mode in which the toothed belt of the above (A) in which the tension member is located at a position in contact with the surface of the tooth bottom portion is used, and the gap S is provided between the tip of the pulley tooth and the belt tooth bottom. In the above toothed belt power-transmission devices, the gap S is changed to 0.5 mm (Comparative Example 9) and 0.8 mm (Comparative Example 10). Regarding the running performance, the rank was B in all cases under the low tension (7.0 kN) condition, but the rank was C under the condition of a tension of 8.0 kN in Comparative Example 10 in which the gap S was large, and the rank was D in all cases with an early failure (tooth chipping) under the highest tension (11.2 kN) condition.

The toothed belt power-transmission device in Comparative Example 11 has a mode in which the toothed belt of the above (C) in which the tension member is located at a position in contact with the surface of the tooth bottom portion is used, and the gap S is not provided between the tip of the pulley tooth and the belt tooth bottom (the belt tooth bottom comes into contact with the pulley tooth). Regarding the running performance, the rank was C due to the wear of the belt tooth bottom even under a low tension (7.0 kN) condition, and the rank was D with an early failure (tension member breakage) under a higher tension condition.

From the results shown in Table 4, it was verified that even in the toothed belt having a specification higher in strength [pitch of belt teeth: 14 mm, belt width: 25 mm, tension member 2 (diameter D=3.3 mm, strength: 11 kN)], the same tendency as that of the toothed belt shown in Table 1 was observed, and the mode of the present invention can be adapted to power-transmission under a high tension condition and is a mode advantageous for power-transmission and durability of the tooth portion.

<Comparative Verification in Table 5>

Table 5 shows configurations of the toothed belts in Examples 16 and 18 and Reference Example 3 in order to compare the cases where the pitches of the tension members in the toothed belt in Example 16 (pitch of tension members: 3.9 mm, the number of tension members: 6, belt strength: 2.65 kN/mm) are changed to 4.8 mm (Example 18) and 3.3 mm (Reference Example 3). In addition, Table 5 also shows configurations of the toothed belts in Examples 19 and 20 in which the belt strength (configuration and array density of the tension members) is equivalent to that of Example 16 and the scale of the belt teeth is larger than that of Example 16. Further, Table 5 also shows a configuration of the toothed belt in Reference Example 4 in which the belt strength (configuration and array density of the tension members) is equivalent to that of Example 16 but the scale of the belt teeth is smaller than that of Example 16.

Example 18 and Reference Example 3

In Example 18 in which the pitch of tension members was larger than that of Example 16 and the number of tension members was decreased to five (the density of the tension member array was decreased), the belt strength was decreased (the belt strength: 2.20 kN/mm).

Also in the toothed belt in Example 18, no rust was generated in the tension member in the salt spray test, the decrease in belt strength was small, and the rust preventability was excellent. Regarding the running performance, the rank was A under the low tension (7.0 kN) condition, and the rank was C under the high tension (8.0 kN, 11.2 kN) condition due to the occurrence of tension member breakage before reaching 1,200,000 cycles (1,000,000 to 1,100,000 cycles), which was a practical level depending on the use conditions.

In Reference Example 3 in which the pitch of tension members was reduced to the limit and the tension members were arrayed without gaps, the belt strength was most increased (belt strength: 3.08 kN/mm), but the running performance was ranked D due to an early failure (belt cut in round slice) under any tension condition. When the interval d between adjacent tension members is 0, the thermoplastic elastomer does not flow between the tension members, and the periphery of the tension members is not held by the thermoplastic elastomer. Therefore, when the belt runs, the adjacent tension members were separated from each other, and the belt was cut in round slice.

It was confirmed from the above results that the toothed belt can be practically used when the pitch of the tension members was 3.9 mm to 4.8 mm and the belt strength per 1 mm of the belt width was 2.20 kN/mm to 2.65 kN/mm.

Examples 19 and 20

In Examples 19 and 20, the scales of the belt teeth were respectively changed to scales corresponding to tooth pitches of 20 mm (tooth type: G20M) and 25 mm (tooth type: G25M) as compared with the toothed belt having a tooth pitch of 14 mm (tooth type: G14M) in Example 16.

Also in the toothed belts of Examples 19 and 20, no rust was generated in the tension member in the salt spray test, the decrease in belt strength was small, and the rust preventability was excellent. Regarding the running performance, the rank was A under the low tension (7.0 kN, 8.0 kN) condition, and the rank was B under the high tension (11.2 kN) condition as in Example 16.

Reference Example 4

Reference Example 4 provides a toothed belt having a tooth pitch of 8 mm (tooth type: S8M) in which the scale of the belt teeth is reduced while the configuration and the array density of the tension members are equivalent to those of the toothed belt having a tooth pitch of 14 mm (tooth type: G14M) in Example 16. That is, this is an example in which the belt strength is equivalent to that of Example 16, but the scale of the belt teeth is small.

Also in the toothed belt in Reference Example 4, no rust was generated in the tension member in the salt spray test, the decrease in the belt strength was small, and the rust preventability was excellent. However, regarding the running performance, the rank was D (cannot be practically used) due to an early failure (tooth chipping) under the low tension (7.0 kN) condition.

Therefore, in the practical use, the scale of the belt teeth is preferably a tooth pitch of 14 mm or more.

<Comparative Verification in Table 6>

Table 6 shows configurations of the toothed belts in Examples 16, 21, and 22 in order to compare the cases where the thermoplastic elastomer in the toothed belt in Example 16 is changed from polyester polyurethanes to polyether polyurethanes (Example 21) and polyamides (Example 22).

Table 6 shows configurations of the toothed belts in Examples 16 and 23 to 26 in order to compare cases where the hardness of the polyester polyurethane-based thermoplastic elastomer in the toothed belt in Example 16 is changed from 50° to 30° (Example 23), 40° (Example 24), 60° (Example 25), and 70° (Example 26).

Examples 21 and 22

In Example 21 in which the polyester polyurethane-based thermoplastic elastomer in the toothed belt in Example 16 was changed to polyether polyurethanes and Example 22 in which the polyester polyurethane-based thermoplastic elastomer in the toothed belt in Example 16 was changed to polyamides, the belt strength was equivalent to that of Example 16. Also in the toothed belts in Examples 21 and 22, no rust was generated in the tension member in the salt spray test, the decrease in the belt strength was small, and the rust preventability was excellent. Regarding the running performance, the rank was A under the low tension (7.0 kN, 8.0 kN) condition, and the rank was B under the high tension (11.2 kN) condition as in Example 16.

Examples 23 to 26

In Examples 23 and 24 in which the hardness of the thermoplastic elastomer was lower than that of Example 16 and in Examples 25 and 26 in which the hardness was higher than that of Example 16, the belt strength was equivalent to that of Example 16. Also in the toothed belts in Examples 23 to 26, no rust was generated in the tension member in the salt spray test, the decrease in the belt strength was small, and the rust preventability was excellent.

Regarding the running performance, in Example 25 in which the hardness was increased, the rank was A under the low tension (7.0 kN, 8.0 kN) condition, and the rank was B under the high tension (11.2 kN) condition as in Example 16. In Example 26 in which the hardness was further higher, the rank was A under the low tension (7.0 kN) condition, and the rank was B under the high tension (8.0 kN, 11.2 kN) condition. On the other hand, in Example 24 in which the hardness was reduced, the rank was A under the low tension (7.0 kN) condition, and the rank was B under the high tension (8.0 kN, 11.2 kN) condition. In Example 23 in which the hardness was further lower, the rank was B under the low tension (7.0 kN, 8.0 kN) condition, and the rank was C due to occurrence of the tooth chipping in 1,000,000 cycles under the high tension (11.2 kN) condition. All of these Examples were practical levels depending on the use conditions.

<Comparative Verification in Table 7>

Table 7 shows configurations of the toothed belts in Examples 27 to 29 and Comparative Examples 12 to 14 in order to compare the above (A) to (C) with the toothed belts (tooth type: G20M, see FIG. 7), which uses the tension member 3 (diameter D=4.3 mm, strength: 22 kN) with the pitch of the belt teeth of 20 mm and the belt width of 25 mm, as the toothed belts having a specifications higher in scale and higher in strength.

Examples 27 to 29

The toothed belt power-transmission devices of Examples 27 to 29 have the mode of the toothed belt of the above (B) in which the cover layer is provided on the inner peripheral side of the tension member, and the gap S is not provided so that the belt tooth bottom comes into contact with the pulley tooth. In the above toothed belt power-transmission devices, the thickness of the cover layer is changed to 0.2 mm (Example 27), 0.5 mm (Example 28), and 1.0 mm (Example 29). In any toothed belt, no rust was generated in the tension member in the salt spray test, the decrease in the belt strength was small, and the rust preventability was excellent. Regarding the running performance, the rank was B in each of Example 27 and Example 29 from the condition of a low tension (7.0 kN) to the condition of a high tension (11.2 kN). In contrast, the rank was A in Example 28 from the condition of a low tension (7.0 kN) to the condition of a high tension (11.2 kN).

That is, the toothed belt in which the thickness of the cover layer was 0.2 mm to 1.0 mm can be practically used up to the highest tension (11.2 kN) condition. In particular, a toothed belt in which the thickness of the cover layer is about 0.5 mm (about 0.4 mm to 0.6 mm) is preferable. The toothed belt power-transmission devices in Examples 27 to 29 can be adapted to power-transmission under a high tension condition, and have a mode advantageous in power-transmission performance and durability of the tooth portion.

Comparative Examples 12 to 14

The toothed belts in Comparative Examples 12 to 14 have a mode in which neither the cover layer nor the reinforcing fabric is provided on the inner peripheral side of the tension member (steel cord), and the tension member is located at a position in contact with the surface of the belt tooth bottom. In the salt spray test, rust was generated in the tension member, a decrease in the belt strength was also observed, and no rust preventability was obtained.

The toothed belt power-transmission devices in Comparative Examples 12 and 13 have the mode in which the toothed belt of the above (A) in which the tension member is located at a position in contact with the surface of the tooth bottom portion is used, and the gap S is provided between the tip of the pulley tooth and the belt tooth bottom. In the above toothed belt power-transmission devices, the gap S is changed to 0.5 mm (Comparative Example 12) and 0.8 mm (Comparative Example 13). Regarding the running performance, all the ranks were B from the condition of a low tension (7.0 kN) to the condition of a high tension (11.2 kN).

The toothed belt power-transmission device in Comparative Example 14 has a mode in which the toothed belt of the above (C) in which the tension member is located at a position in contact with the surface of the tooth bottom portion is used, and the gap S is not provided between the tip of the pulley tooth and the belt tooth bottom (the belt tooth bottom comes into contact with the pulley tooth). Regarding the running performance, the rank was C due to the wear of the belt tooth bottom under a low tension (7.0 kN) condition, and the rank was C under a higher tension condition.

From the results shown in Table 7, it was verified that even in the toothed belt having specifications higher in scale and higher in strength [pitch of belt teeth: 20 mm, belt width: 25 mm, tension member 3 (diameter D=4.3 mm, strength: 22 kN)], the mode of the present invention can be adapted to power-transmission under a high tension condition and is a mode advantageous in power-transmission property and durability of the tooth portion as in the toothed belt shown in Table 1.

<Comparative Verification in Table 8>

Table 8 shows configurations of the toothed belts in Examples 28, 30, and 31 in order to compare the cases where the pitch of tension members in the toothed belt in Example 28 (pitch of tension members: 6.0 mm, the number of tension members: 4, belt strength: 3.67 kN/mm) is changed to 7.3 mm (Example 30), and 4.9 mm (Example 31). Table 8 also shows a configuration of the toothed belt in Example 32 in which the belt strength (the configuration and the array density of the tension members) is equivalent to that of Example 28 and the scale of the belt teeth is larger than that of Example 28. Further, Table 8 also shows a configuration of the toothed belt in Reference Example 5 in which the belt strength (the configuration and the array density of the tension members) is equivalent to that of Example 28 but the scale of the belt teeth is smaller than that of Example 28.

Examples 30 and 31

In Example 31 in which the pitch of tension members was smaller than that of Example 28 and the number of tension members was increased to five (the density of the tension member array was increased), the belt strength was increased (belt strength: 4.48 kN/mm).

On the other hand, in Example 30 in which the pitch of tension members was larger than that of Example 28 and the number of tension members was decreased to three (the density of the tension member array was decreased), the belt strength was decreased (belt strength: 2.75 kN/mm).

Also in the toothed belts in Examples 30 and 31, no rust was generated in the tension member in the salt spray test, the decrease in the belt strength was small, and the rust preventability was excellent. Regarding the running performance, the rank was A in Example 31 from the condition of a low tension (7.0 kN) to the condition of a high tension (11.2 kN) as in Example 28. In Example 30, the rank was A under the low tension (7.0 kN) condition, and the rank was C under the high tension (8.0 kN, 11.2 kN) condition due to occurrence of tension member breakage before reaching 1,200,000 cycles (1,100,000 to 1,180,000 cycles). All of these Examples were practical levels depending on the use conditions.

It was confirmed from the above results that the toothed belt can be practically used when the pitch of the tension members was 4.9 mm to 7.3 mm and the belt strength per 1 mm of the belt width was in a range of 2.75 kN/mm to 4.48 kN/mm.

Example 32

In Example 32, the scale of the belt teeth was changed to a scale corresponding to a tooth pitch of 25 mm (tooth type: G25M) as compared with the toothed belt having a tooth pitch of 20 mm (tooth type: G20M) in Example 28.

Also in the toothed belt in Example 32, no rust was generated in the tension member in the salt spray test, the decrease in the belt strength was small, and the rust preventability was excellent. Regarding the running performance, the rank was A from the condition of a low tension (7.0 kN) to the condition of a high tension (11.2 kN) as in Example 28.

Reference Example 5

Reference Example 5 provides a toothed belt having a tooth pitch of 8 mm (tooth type: S8M) in which the scale of the belt teeth is reduced while the configuration and the array density of the tension members are equivalent to those of the toothed belt having a tooth pitch of 20 mm (tooth type: G20M) in Example 28. That is, this is an example in which the belt strength is equivalent to that of Example 28, but the scale of the belt teeth is small.

Also in the toothed belt in Reference Example 5, no rust was generated in the tension member in the salt spray test, the decrease in the belt strength was small, and the rust preventability was excellent. However, regarding the running performance, the rank was D (cannot be practically used) due to an early failure (tooth chipping) under the low tension (7.0 kN) condition.

<Comparative Verification in Table 9>

Table 9 shows configurations of the toothed belts in Examples 28, 33, and 34 in order to compare the cases where the thermoplastic elastomer in the toothed belt in Example 28 was changed from polyester polyurethanes to polyether polyurethanes (Example 33) and polyamides (Example 34).

Table 9 shows configurations of the toothed belts in Examples 28 and 35 to 38 in order to compare the cases where the hardness of the polyester polyurethane-based thermoplastic elastomer in the toothed belt in Example 28 was changed from 50° to 30° (Example 35), 40° (Example 36), 60° (Example 37), and 70° (Example 38).

Examples 33 and 34

In Example 33 in which the polyester polyurethane-based thermoplastic elastomer in the toothed belt in Example 28 was changed to polyether polyurethanes and Example 34 in which the polyester polyurethane-based thermoplastic elastomer in the toothed belt in Example 28 was changed to polyamides, the belt strength was equivalent to that of Example 28. Also in the toothed belts of Examples 33 and 34, no rust was generated in the tension member in the salt spray test, the decrease in the belt strength was small, and the rust preventability was excellent. Regarding the running performance, the rank was A from the condition of a low tension (7.0 kN) to the condition of a high tension (11.2 kN) as in Example 28.

Examples 35 to 38

In Examples 35 and 36 in which the hardness of the thermoplastic elastomer was lower than that of Example 28, and in Examples 37 and 38 in which the hardness was higher than that of Example 28, the belt strength was equivalent to that of Example 28. Also in the toothed belts of Examples 35 to 38, no rust was generated in the tension member in the salt spray test, the decrease in the belt strength was small, and the rust preventability was excellent.

Regarding the running performance, in Example 37 in which the hardness was increased, the rank was A from the condition of a low tension (7.0 kN) to the condition of a high tension (11.2 kN) as in Example 28. In Example 38 in which the hardness was further higher, the rank was A under the low tension (7.0 kN, 8.0 kN) condition, and the rank was B under the high tension (11.2 kN) condition. On the other hand, in Example 36 in which the hardness was reduced, the rank was A under the condition of low tension (7.0 kN, 8.0 kN), and the rank was B under the condition of high tension (11.2 kN). In Example 35 in which the hardness was further lower, the rank was B under the low tension (7.0 kN, 8.0 kN) condition, and the rank was C due to occurrence of the tooth chipping in 1,000,000 cycles under the high tension (11.2 kN) condition. All of these Examples were practical levels depending on the use conditions.

<Comparative Verification in Table 10>

Table 10 shows a configuration of the toothed belt (tooth type: G20M) in Example 39, which uses a tension member 4 (diameter D=6.4 mm, strength: 36 kN) with a pitch of belt teeth of 20 mm and a belt width of 35 mm, as a toothed belt having a specification higher in strength.

Example 39

The toothed belt power-transmission device in Example 39 has a mode according to Example 28 having a cover layer with a thickness of 0.5 mm, and a configuration and array of the tension members are changed.

The toothed belt in Example 39 has a pitch of tension members of 8.1 mm (the number of tension members: 4, belt strength: 4.11 kN/mm). Also in the toothed belt in Example 39, no rust was generated in the tension member in the salt spray test, the decrease in the belt strength was small, and the rust preventability was excellent. Regarding the running performance, the rank was A from the condition of a low tension (7.0 kN) to the condition of a high tension (11.2 kN).
<Comparative Verification in Table 11>

Table 11 shows configurations of the toothed belts in Examples 40 and 41 and Reference Example 6, which are a toothed belt using a tension member 5 (diameter D=1.6 mm, strength: 3.0 kN), as the toothed belt having a scale of belt tooth (tooth pitch: 14 mm, tooth type: G14M) equivalent to that of the toothed belt described in Patent Literature 4 but having a low strength specification.

Examples 40 and 41 and Reference Example 6

The toothed belt power-transmission devices in Examples 40 and 41 and Reference Example 6 have a mode according to Example 2 having a cover layer with a thickness of 0.5 mm, and the configuration and array of the tension members are changed.

The toothed belt in Example 40 has a pitch of tension members of 2.1 mm (the number of tension members: 9, belt strength: 1.35 kN/mm), and the toothed belt in Example 41 has a pitch of tension members of 1.8 mm (the number of tension members: 10, belt strength: 1.50 kN/mm).

Also in the toothed belts in Examples 40 and 41, no rust was generated in the tension member in the salt spray test, the decrease in the belt strength was small, and the rust preventability was excellent. Regarding the running performance, the rank was B under the low tension (7.0 kN, 8.0 kN) condition, and the rank was C under the high tension (11.2 kN) condition due to occurrence of tension member breakage in 1,000,000 cycles. All of these Examples were practical levels depending on the use conditions.

In Reference Example 6 in which the pitch of tension members was reduced to the limit and the tension members were arrayed without gaps, the belt strength was most increased (belt strength: 1.65 kN/mm), but the running performance was ranked D due to an early failure (belt cut in round slice) under any tension condition.

It was confirmed from the above results that, by providing a cover layer having a thickness of 0.2 mm to 1.0 mm between the belt tooth bottom and the tension member, the toothed belt and the toothed belt power-transmission device having each specification in which the scale of the belt teeth and the level of the belt strength (the configuration and the array density of the tension members) are widely changed can be adapted to the power-transmission in a high load environment (high tension condition) and can also be adapted to the rust preventability associated with installation on ocean (offshore wind power generation).

Although preferred embodiments of the present invention have been described above, the present invention is not limited to the above-described embodiments, and various design changes can be made within the scope of the claims.

The toothed belt power-transmission device according to the present invention is not limited to being used as a blade angle adjustment device in a wind power generator, an elevating conveyance device, or the like, and can be used as any device.

The toothed belt may be either an open-end belt or an endless belt.

The present application is based on Japanese Patent Application No. 2021-056839 filed on Mar. 30, 2021, Japanese Patent Application No. 2021-206966 filed on Dec. 21, 2021, and Japanese Patent Application No. 2022-045220 filed on Mar. 22, 2022, the contents of which are incorporated herein by reference.

REFERENCE SIGNS LIST

1 toothed belt power-transmission device
10 toothed belt
11 tension member
12 back portion
121 cover layer
13 belt tooth
14 belt tooth bottom
50 toothed pulley
53 pulley tooth
54 pulley tooth bottom

What is claimed is:

1. A toothed belt comprising:
a back portion;
a tension member embedded in the back portion in a belt longitudinal direction and comprising a twisted cord comprising a steel fiber;
a plurality of belt teeth formed on an inner peripheral side of the back portion along the belt longitudinal direction; and
a cover layer provided between the tension member and a belt tooth bottom formed between the belt teeth, the cover layer being exposed as part of the belt tooth bottom,
wherein the toothed belt has a total belt thickness of 9 mm to 16 mm, and the cover layer has a thickness in a range of 0.3 mm to 0.6 mm,
the back portion including a part disposed on a side of the tension member opposite to the plurality of belt teeth, and
the back portion, the belt teeth, and the cover layer are integrally formed of a thermoplastic elastomer.

2. The toothed belt according to claim 1, wherein a pitch between the belt teeth is 14 mm or more, and a height of each of the belt teeth is 5 mm or more.

3. The toothed belt according to claim 1, wherein the plurality of belt teeth, when the toothed belt is wound around a plurality of toothed pulleys, each having a plurality of pulley teeth formed on an outer periphery thereof so as to mesh with the belt teeth, is configured such that a tip portion of each of the belt teeth comes into contact with a pulley tooth bottom formed between the pulley teeth, and a tip portion of each of the pulley teeth comes into contact with the belt tooth bottom.

4. The toothed belt according to claim 3, which is to be used in an environment in which a tension applied to the toothed belt fluctuates due to an external factor, and the tension is 0.30 kN/mm or more in a normal state and is 0.80 kN/mm to 1.10 kN/mm at most.

5. A toothed belt power-transmission device comprising:
the toothed belt according to claim 1; and
a plurality of toothed pulleys each having a plurality of pulley teeth formed on an outer periphery thereof so as to mesh with the belt teeth of the toothed belt, wherein the toothed belt is wound around the plurality of toothed pulleys such that a tip portion of each of the belt teeth comes into contact with a pulley tooth bottom formed between the pulley teeth and a tip portion of each of the pulley teeth comes into contact with the belt tooth bottom, thereby performing synchronous power-transmission.

6. The toothed belt power-transmission device according to claim 5, wherein the toothed belt is used in an environment in which a tension applied to the toothed belt fluctuates due to an external factor, and the tension is 0.30 kN/mm or more in a normal state and is 0.80 kN/mm to 1.10 kN/mm at most.

* * * * *